(12) United States Patent
O'Connell

(10) Patent No.: US 11,005,669 B2
(45) Date of Patent: May 11, 2021

(54) PUF GENERATORS BASED ON SRAM BIT CELLS

(71) Applicant: Taiwan Semiconductor Manufacturing Co., Ltd., Hsin-Chu (TW)

(72) Inventor: Cormac Michael O'Connell, Kanata (CA)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 238 days.

(21) Appl. No.: 16/125,535

(22) Filed: Sep. 7, 2018

(65) Prior Publication Data
US 2020/0084052 A1  Mar. 12, 2020

Related U.S. Application Data

(60) Provisional application No. 62/585,760, filed on Nov. 14, 2017.

(51) Int. Cl.
*H04L 9/32* (2006.01)
*G11C 11/418* (2006.01)
(Continued)

(52) U.S. Cl.
CPC .......... *H04L 9/3278* (2013.01); *G11C 11/412* (2013.01); *G11C 11/418* (2013.01); *G11C 11/419* (2013.01)

(58) Field of Classification Search
CPC ... H04L 9/3278; H04L 9/0866; G11C 11/418; G11C 11/419; G11C 11/412; G11C 7/24
See application file for complete search history.

(56) References Cited

U.S. PATENT DOCUMENTS 9,852,791 B1 * 12/2017 Tseng ................. H01L 45/06
2012/0230087 A1 * 9/2012 Chellappa ............ G11C 11/413
365/154

(Continued)

OTHER PUBLICATIONS

Vatajelu, Elena Ioana et al., "Towards a Highly Reliable SRAM-Based PUFs", 2016 EDAA, pp. 273-276. (Year: 2016).*

(Continued)

*Primary Examiner* — Michael Pyzocha
(74) *Attorney, Agent, or Firm* — Duane Morris LLP

(57) ABSTRACT

Disclosed is a physical unclonable function generator circuit and method. In one embodiment, a physical unclonable function (PUF) generator includes: a PUF cell array that comprises a plurality of bit cells, wherein each of the plurality of bit cells comprises at least two pre-charge transistors, at least one enable transistor, and at least two storage nodes, wherein the at least two storage nodes are pre-charged with substantially the same voltages by the respective at least two pre-charge transistors allowing each of the plurality of bit cells having a first metastable logical state; and an authentication circuit, coupled to the PUF cell array, wherein the authentication circuit is configured to access and determine second logical states of bit cells in at least one row of the PUF cell array by turning on the at least one enable transistor and turning off the at least two pre-charge transistors of each of the bit cell in the at least one row of the PUF cell array, and based on the determined second logical states of the bit cell in the at least one row of the PUF cell array, to generate a PUF signature.

20 Claims, 23 Drawing Sheets

(51) Int. Cl.
*G11C 11/419* (2006.01)
*G11C 11/412* (2006.01)

(56) References Cited

U.S. PATENT DOCUMENTS

| | | | | |
|---|---|---|---|---|
| 2013/0111282 | A1* | 5/2013 | Clark | G11C 29/40 |
| | | | | 714/718 |
| 2014/0119102 | A1* | 5/2014 | Shankar | G11C 5/063 |
| | | | | 365/154 |
| 2014/0185795 | A1* | 7/2014 | Gotze | H04L 9/0866 |
| | | | | 380/44 |
| 2015/0146869 | A1* | 5/2015 | Yamamoto | H03K 3/0375 |
| | | | | 380/44 |
| 2017/0038807 | A1* | 2/2017 | Bittlestone | G06F 1/26 |
| 2017/0242660 | A1* | 8/2017 | Katoh | H04L 9/0869 |
| 2017/0277457 | A1* | 9/2017 | Lu | G06F 3/0673 |
| 2018/0096172 | A1* | 4/2018 | Lu | G11C 11/418 |
| 2018/0102907 | A1* | 4/2018 | Lin | G06F 12/1408 |
| 2019/0068190 | A1* | 2/2019 | Karpinskyy | H04L 9/0866 |
| 2019/0342106 | A1* | 11/2019 | Li | H04L 9/3278 |

OTHER PUBLICATIONS

Mills, Aaron, "Design and evaluation of a delay-based FPGA physically unclonable function", Graduate Theses and Dissertations, 2012, 50 pages. (Year: 2012).*

\* cited by examiner

PUF GENERATORS BASED ON SRAM BIT CELLS

This application claims benefit to U.S. Provisional Patent Application No. 62/585,760, filed Nov. 14, 2017, which is incorporated by reference herein in its entirety.

BACKGROUND

With the increasing use of integrated circuits in electronic devices that provide different types of information for a variety of different applications, there has been an increasing need to adequately protect sensitive and/or critical information that may be stored within an electronic device to limit access to such information to only other devices that have permission to access. A physically unclonable function (PUF) generator is a physical structure generally within an integrated circuit that provides a number of corresponding outputs (e.g., responses) in response to inputs (e.g., challenges/requests) to the PUF generator so as to create a unique identity of the integrated circuit. Since the PUF generator is based on intrinsic properties of a manufacturing process, the PUF has various advantages over conventional authentication approaches that inscribes an identity on a device, which may be mimicked and/or reverse engineered more easily.

There are many different implementation approaches including delay-chain-based PUF generators and memory-based PUF generators. A delay-chain-based PUF generator employ a set of delay chains comprising a number of logic devices and different delay can be used as a PUF signature. On the other hand, a memory-based PUF generator translates the variations in an array of memory devices, typically either SRAM (static random-access memory) or DRAM (dynamic random-access memory) devices, into a binary sequence. Both methods are based on randomness in physical properties among devices caused by inherent variations in a semiconductor manufacturing process. A PUF generator candidate should be unique, unclonable and reliable. Furthermore, it should also have small area, high throughput rate, low latency and low power consumption. Currently, both SRAM and DRAM based PUF generators suffer various limitations. For example, a SRAM-based PUF generator can be only accessed during boot time, and do not provide strong PUF configuration (i.e., number of CRPs). There exists a need to develop a PUF generator that can be queried during run-time, while providing a large CRP space.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1:
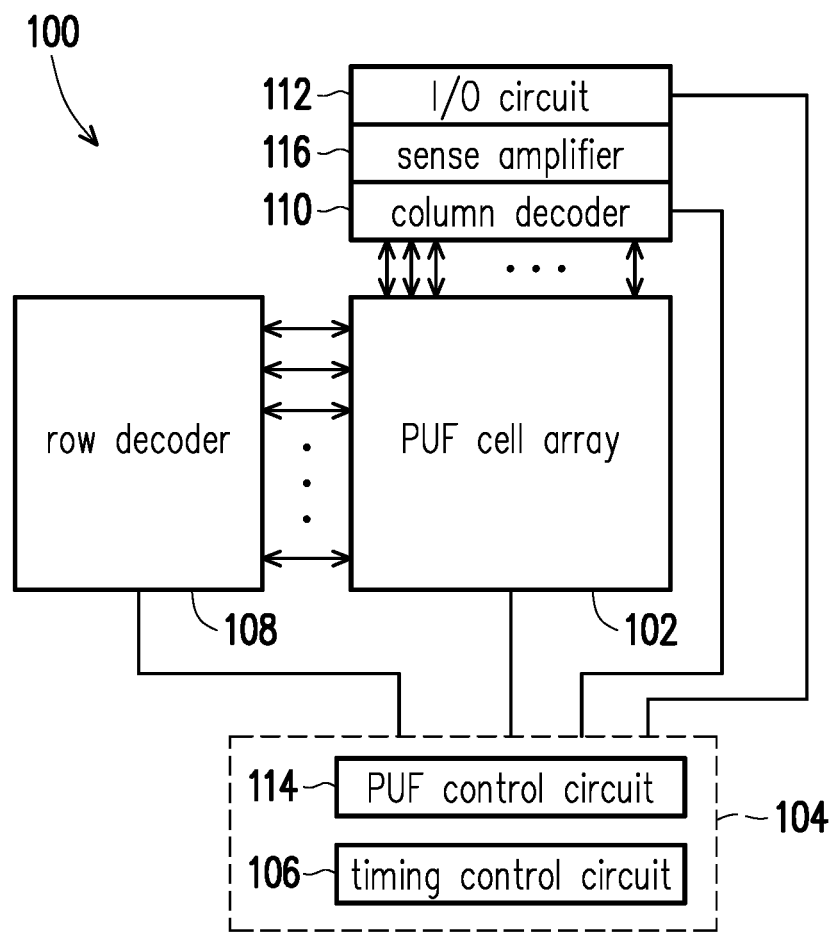
FIG. 1 illustrates a physical unclonable function (PUF) generator, in accordance with various embodiments of present disclosure.

The following disclosure describes various exemplary embodiments for implementing different features of the subject matter. Specific examples of components and arrangements are described below to simplify the present disclosure. These are, of course, merely examples and are not to be limiting. For example, it will be understood that when an element is referred to as being "connected to" or "coupled to" another element, it may be directly connected to or coupled to the other element, or one or more intervening elements may be present.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Additionally, it will be understood that when an element is referred to as being "connected to" or "coupled to" another element, it may be directly connected to or coupled to the other element, or one or more intervening elements may be present.

The feature described herein may be embodied in different forms and are not to be constructed as being limited to the examples described herein. Rather, the examples described herein have been provided so that this disclosure will be thorough and complete, and will convey the full scope of the disclosure to one of ordinary skill in the art. Certain embodiments are not described in greater detail with reference to the accompanying drawings.

In the following description, the same drawing reference numerals are used for the same elements even in different drawings. The maters defined in the description, such as detailed construction and elements, are provided to assist in a comprehensive understanding of the preset examples. Accordingly, it is apparent that the embodiments are able to be carried out without those specifically defined matters. Also, well-known functions or constructions are not described in detail since they would obscure the embodiments with unnecessary detail.

While the expressions such as "first" or "second" are potentially used to refer to various elements, the elements are not to be limited by the expressions. The expressions are used only for the purpose of distinguishing one element from the other.

The expressions are used herein only for the purpose of explaining specific embodiments and not to be limiting. An expression in singular form encompasses plural meaning, unless otherwise specified. Throughout the description, the expression "comprise" or "have" is used only to designate the existence of a characteristic, number, step, operation, element, component or a combination thereof which are described herein, but not to preclude the possibility of existence of one or more of the other characteristics, numbers, steps, operations, elements, components or combinations of these or additional aspects.

A physically unclonable function (PUF) generator is generally used for authentication and secret key storage without requiring secure electrically erasable programmable read-only memory (EEPROMs) and/or other expensive hardware (e.g., battery-backed static random-access memory). Instead of storing a key in a digital memory, a PUF generator derives a key based its unique physical characteristics caused by inherent process variations to differentiate itself from others that are produced even from a same fabrication process. Generally, such key is referred to as a "PUF signature". Variations in a number of parameters can be used to define such a PUF signature such as, for example, gate delay, threshold voltage, power-on state, strength difference between cross-coupled inverters, and/or any of a variety of physical characteristics of an IC.

In an example of using the manufacturing variability of each bit cell across a memory-based PUF generator to generate a PUF signature, intrinsic tendency of each bit cell caused by aforementioned variations in parameters through a fundamentally defective and non-uniform manufacturing process may be used to determine whether such a bit cell is suitable (i.e., strong tendency to generate a logical state either "1" or "0") to provide a reliable PUF signature, in accordance with various embodiments of the present disclosure using different techniques to trigger this determination process. It is understood that even though an SRAM device includes symmetric cells (bit cells) in design, one or more manufacturing variabilities may still cause each bit cell of the SRAM device to be unique and one of its uniqueness is intrinsically tend to be at a high state (i.e., a logical "1") or at a low state (i.e., a logical "0") while the SRAM device is accessed (e.g., powered-on, read, written, etc.). In other words, each bit cell may have an intrinsic tendency to present either a logical "1" or a logical "0", and moreover, some bit cells may have a strong intrinsic tendency and some bit cells may have a weak intrinsic tendency. When a bit cell has a strong intrinsic tendency, the bit cell may remain at its "preferred" logical state for a longer time or transition to its "preferred" logical state very quickly and/or at a statistically higher frequency when the memory-based PUF generator is evaluated and accessed. In some embodiments, such a bit cell may be referred to as a "stable bit cell". When a bit cell has a weak intrinsic tendency, the bit cell does not have a "preferred" logical state. That is, the bit cell with weak intrinsic tendency may sometimes present (e.g., remain at or transition to) a high state and sometimes present (e.g., remain at or transition to) a low state without statistic preference when the memory-based PUF generator is accessed. In some embodiments, such a bit cell may be referred to as an "unstable bit cell". A binary sequence of logical states of the stable bit cells are assembled as a PUF signature of the memory-based PUF generator. This disclosure presents various embodiments of PUF generators with advantages over the state-of-the-art techniques that will be discussed in detail below.

FIG. 1 illustrates a physical unclonable function (PUF) generator 100, in accordance with various embodiments of present disclosure. In the illustrated embodiment of FIG. 1, the PUF generator 100 comprises a PUF cell array 102, an authentication circuit 104, a row decoder 108, a column decoder 110, a sense amplifier 116, and an input/output (I/O) circuit 112. The authentication circuit 104 further comprises a PUF control circuit 114 and a timing control circuit 106. In some embodiments, despite not being shown in FIG. 1, all the components may be coupled to each other and further to the authentication circuit 104 such that they are controlled. Although, in the illustrated embodiment of FIG. 1, each component is shown as a separate block for the purpose of bit cells are arranged in a column-row configuration, i.e., an array, which will be shown and discussed in further detail below with respect to an exemplary schematic diagram of FIG. 2A. The PUF cell array 102 includes a plurality of bit cells that are arranged in a column-row configuration in which each column has a bit line (BL) and a bit line bar (BLB) and each row has a word line (WL). More specifically, the BL and BLB of each column are respectively coupled to a plurality of bit cells that are disposed in that column, and each bit cell in that column is arranged on a different row and coupled to a respective (different) WL. That is, each bit cell of the PUF cell array 102 is coupled to a BL of a column of the PUF cell array 102, a BLB of the column of the PUF cell array 102, and a WL of a row of the PUF cell array 102. In some embodiments, the BL's and BLB's are arranged in parallel vertically and the WL's are arranged in parallel horizontally (i.e., perpendicular to the BL's and BLB's). It should be noted that the BL, BLB and WL can be arranged differently according to different fabrication technologies and device layout designs, which are within the scope of the disclosure.

The row decoder 108 is configured to receive a row address of the PUF cell array 102 and couple to a WL at that row address. In some embodiments, the column decoder 110 may be optional. The column decoder 110 is configured to receive a column address of the PUF cell array 102 and coupled to a BL and/or BLB at that column address.

In some embodiments, all the components of the authentication circuit 104 (i.e., the PUF control circuit 114 and the timing control circuit 106) may be coupled to a common data bus for inter-communication. In some embodiments, the authentication circuit 104 includes an input port and an output port (both are not shown). The input port of authentication circuit 104 is configured to receive a request/challenge. In some embodiments, the output port of the authentication circuit 104 is configured to transfer a response (e.g., a PUF signature) to an external device based on the stabilized bit cells of one or more rows of the PUF cell array 102. In some embodiments, such input and output ports may be directly coupled to the PUF control circuit 114 of the authentication circuit 104. That is, in accordance with such embodiments, the PUF control circuit 114 is configured to receive a request through the input port and a response through the output port.

As described in detail below in FIGS. 2B-4, each bit cell's logical state is evaluated by the authentication circuit 104 using the disclosed technique. In some embodiments, the PUF control circuit 114 may enable the voltage supply to each bit cells of the PUF cell array 102. The PUF control circuit 114 enables or disables transistors so as to pre-charge at least 2 storage nodes to the same voltage in order to provide metastable logical states on the at least 2 storage nodes in each bit cell of the PUF cell array 102. Further, the PUF control circuit 114 also enables or disables transistors so as allow the metastable logical states on the at least 2 storage nodes in each bit cell of the PUF cell array to stabilize. Further, the PUF control circuit 114 selects one or more rows of the PUF cell array and access bit cells in the selected one or more rows to generate a PUF signature according to their stabilized logical states.

In some embodiments, the PUF control circuit 114 is also configured to control (e.g., increase or decrease) a voltage level applied at each of the WL, VDD and GND. In some embodiments, the PUF control circuit 114 may be also configured to control (e.g., increase or decrease) a voltage level of a supply voltage applied at each of the bit cells. The timing control circuit 106 can be configured to control the width of the WL pulse (e.g., increase or decrease), the start/end time of the pulse, and synchronization between pulses applied on the WL during reading and/or writing process. In some embodiments, the PUF control circuit 114 may be implemented as at least one separate block out of the PUF cell array 102.

Figure 2A:
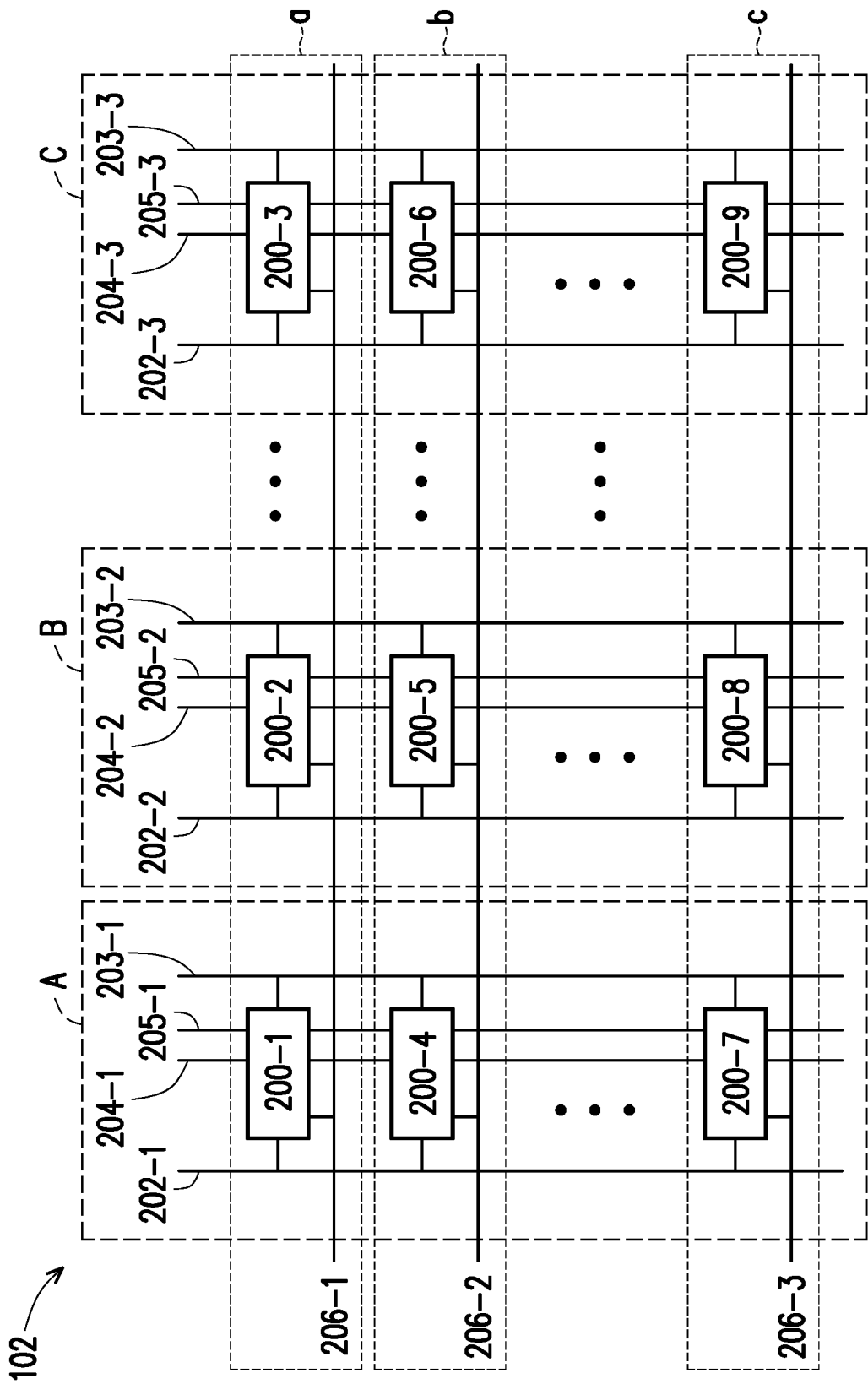
FIG. 2A illustrates an exemplary circuit diagram of a PUF cell array comprising a plurality of bit cells, in accordance with various embodiments of present disclosure.

FIG. 2A illustrates an exemplary circuit diagram of a PUF cell array 102, in accordance with various embodiments of present disclosure. In some embodiments, the PUF cell array 102 includes a plurality of bit cells 200-1, 200-2, 200-3, 200-4, 200-5, 200-6, 200-7, 200-8, and up to 200-9. Although only 9 bit cells are shown, any desired number of bit cells may be included in the PUF cell array 102 while remaining within the scope of the present disclosure. As described above, the bit cells 200-1, 200-2, 200-3, 200-4, 200-5, 200-6, 200-7, 200-8, and 200-9 are arranged in a column-row configuration. More specifically, in some embodiments, the PUF cell array 102 includes bit lines (BL's) 202-1, 202-2, and 202-3 arranged in parallel, bit line bars (BLB's) 203-1, 203-2, and 203-3 also arranged in parallel, and word lines (WL's) 206-1, 206-2, and 206-3 arranged in parallel orthogonally to the BL's and BLB's. In some embodiments, the PUF cell array 102 also includes positive supply voltage power (VDD) 204-1, 204-2, and 204-3, and ground/reference voltage (GND) 205-1, 205-2 and 205-3. As such, the PUF cell array 102 may include a first plurality of columns (e.g, arranged vertically), a second plurality of rows (e.g., arranged horizontally), wherein each column includes a respective pair of BL 202, BLB 203, VDD 204, GND 205, and each row includes a respective WL 206.

For example, as shown in the illustrated embodiment of FIG. 2A, the PUF cell array 102 includes columns "A," "B," and "C," and rows "a," "b," and "c," wherein column A includes respective BL 202-1, BLB 203-1, VDD 204-1 and GND 205-1; column B includes respective BL 202-2, BLB 203-2, VDD 204-2 and GND 205-2; column C includes respective BL 202-3, BLB 203-3, VDD 204-3 and GND 205-3; row a includes a respective WL 206-1; row b includes a respective WL 206-2; and row c includes a respective WL 206-3.

Moreover, each column includes one or more bit cells that are each coupled to the column's respective BL and BLB, and a different separate WL. For example, column A includes bit cells 200-1, 200-4, and 200-7, wherein the bit cells 200-1, 200-4, and 200-7 are each coupled to the BL 202-1, BLB 203-1, VDD 204-1, GND 205-1, and WL's 206-1, 206-2, and 206-3, respectively; column B includes bit cells 200-2, 200-5, and 200-8, wherein the bit cells 200-2, 200-5, and 200-8 are each coupled to the BL 202-2, BLB 203-2, VDD 204-2, GND 205-2, and WL's 206-1, 206-2, and 206-3, respectively; and column C includes bit cells 200-3, 200-6, and 200-9, wherein the bit cells 200-3, 200-6, and 200-9 are each coupled to the BL 202-3, BLB 203-3, VDD 204-3, GND 205-3, and WL's 206-1, 206-2, and 206-3, respectively.

As described above, each bit cell of the PUF cell array 102 (e.g., 200-1, 200-2, 200-3, 200-4, 200-5, 200-6, 200-7, 200-8, 200-9, etc.) may include a plurality of transistors to sense stable logical states and to allow access to the stable logical states. FIG. 2A is merely an example and not to be limiting. For example, the VDD 204, GND 205, BL 202, BLB 203 and WL 206 can be arranged relative to one another differently according to different fabrication technologies and device layout designs, which are within the scope of the disclosure.

Figure 2B:
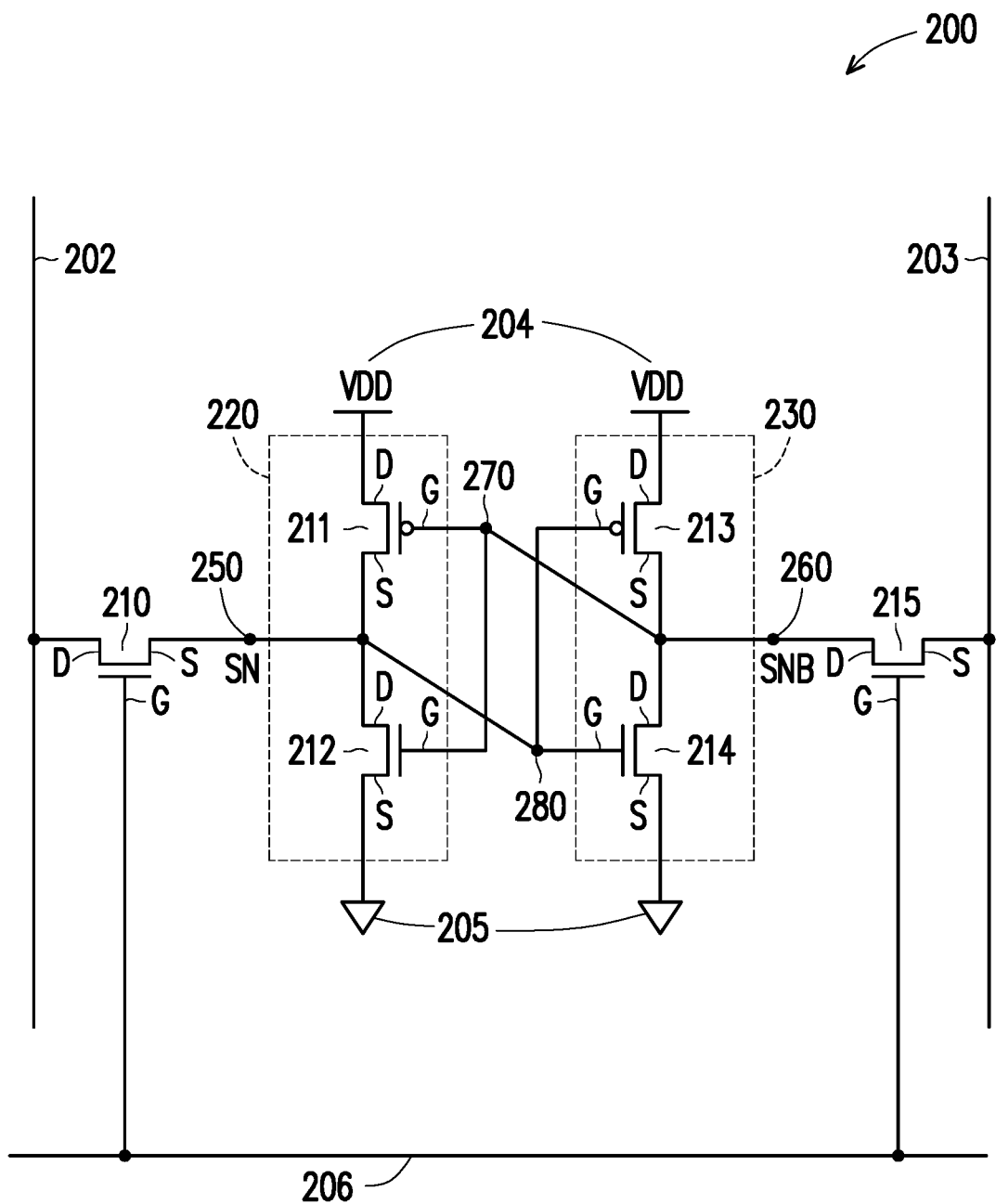
FIG. 2B illustrates an exemplary circuit diagram of a bit cell that is implemented as a 6T-SRAM bit cell, in accordance with various embodiments of the present disclosure.

FIG. 2B illustrates an exemplary circuit diagram of a bit cell 200 that is implemented as a 6T-SRAM bit cell, in accordance with various embodiments of the present disclosure. As shown, the bit cell 200 includes transistors: M1 210, M2 211, M3 212, M4 213, M5 214, and M6 215. Since the bit cells 200 of the PUF cell array 102 are substantially similar to one another, for clarity, the following discussions of configurations and operations of the transistors of the bit cells will be generally directed to the bit cell 200.

In some embodiments, the transistor M2 211 and M3 212 are formed as a first inverter 220 on the left and the transistors M4 213 and M5 214 are formed as a second inverter 230 on the right wherein the first and second inverters 220/230 are coupled to each other. More specifically, source terminal of the transistor M2 211 is coupled with drain terminal of the transistor M3 212 at storage node (SN) 250. Similarly, source terminal of the transistor M4 213 is coupled with drain terminal of the transistor M5 214 at storage node bar (SNB) 260. Terminals G of the transistor M2 211 and M3 212 are coupled together at node 270, while terminals G of the transistors M4 213 and M5 214 are coupled together at node 280. The first and second inverters 220/230 are each coupled between VDD 204 through drain terminal of the transistor M2 211 and M4 213, and GND 205 through the source terminal of the transistor M3 212 and M4 214. In some embodiments, the VDD VDD 204 is controlled by the PUF control circuit 114 of the authentication circuit 104 (FIG. 1). For example, the VDD VDD 204 may range from about 30% of VDD to about 130% of VDD, wherein VDD is a nominal voltage level applied to each of the bit cells 200 of the PUF cell array 102 when the PUF cell array 102 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215 at SNB 260. In addition to being coupled to the inverters 220/230, the transistors M1 210 and M6 215 are both coupled to the WL 206 through gate terminals and each coupled to the BL 202 and BLB 203 through their drain and source terminals, respectively. The transistors M1 210 and M6 215 are typically referred to as access transistors of the bit cell 200. In some embodiments, the transistors M1 210, M3 212, M5 214, and M6 215 each includes an NMOS transistor, and M2 211 and M4 213 each includes a PMOS transistor. Although the illustrated embodiments of FIG. 2B shows that M1-M6 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

In general, when a bit cell 200 (e.g., 200-1, 200-2, 200-3, 200-4, etc.) presents/stores a data bit, a first node 250 of the bit cell is configured to be at a first logical state ("1" or "0"), and a second node 260 of the SRAM bit is configured to be at a second logical state ("0" or "1"), wherein the first and second logical states are complementary with each other. In some embodiments, the first logical state at the first node 250 is the data bit stored by the bit cell. When the bit cell 200 presents a data bit (e.g., a logical "1"), the node 250 is configured to be at the logical "1" state, and the node 260 is configured to be at the logical "0" state.

More specifically, such a data bit may be written to the bit cell 200 by using corresponding BL 202, BLB 203, VDD 204, GND 205, and WL 206. As a representative example, to write a logical "1" to the bit cell 200, in some embodiments, the PUF control circuit 114 turns on the bit cell 200 by pulling up the VDD 204 to a desired value, e.g., VDD. Then the PUF control circuit 114 pulls up the WL 206 to a desired "WL voltage" (e.g., VDD), so that the access transistors M1 210 and M6 215 are turned on. More specifically, the WL 206 remains at the WL voltage for a certain period of time, hereinafter "WL pulse width", which may be controlled by the timing control circuit 106. During the WL pulse width (i.e., the transistors M1 210 and M6 215 remain on), the BL 202 and the BLB 203 are each applied with a first voltage (e.g., VDD) corresponding to a high logical state and a second voltage (e.g., ground) corresponding to a low logical state, respectively, to write a logical "1" to the node 250 and a logical "0" to the node 260. On the other hand, to read out the written, or stored, logical state from the bit cell 200, in some embodiments, the PUF control circuit 114 pulls up the VDD 204 of the bit cell 200 to about VDD. The PUF control circuit 114 then pre-charges the BL 202 and BLB 203 to VDD. The PUF control circuit 114 pulls up the WL 206 to the desired WL voltage (e.g., VDD), so that the access transistors M1 210 and M6 215 are turned on. Accordingly, the logical state stored in the bit cell 200 is read out by comparing either a voltage difference or a current difference between the BL 202 and the BLB 203.

Figure 3:
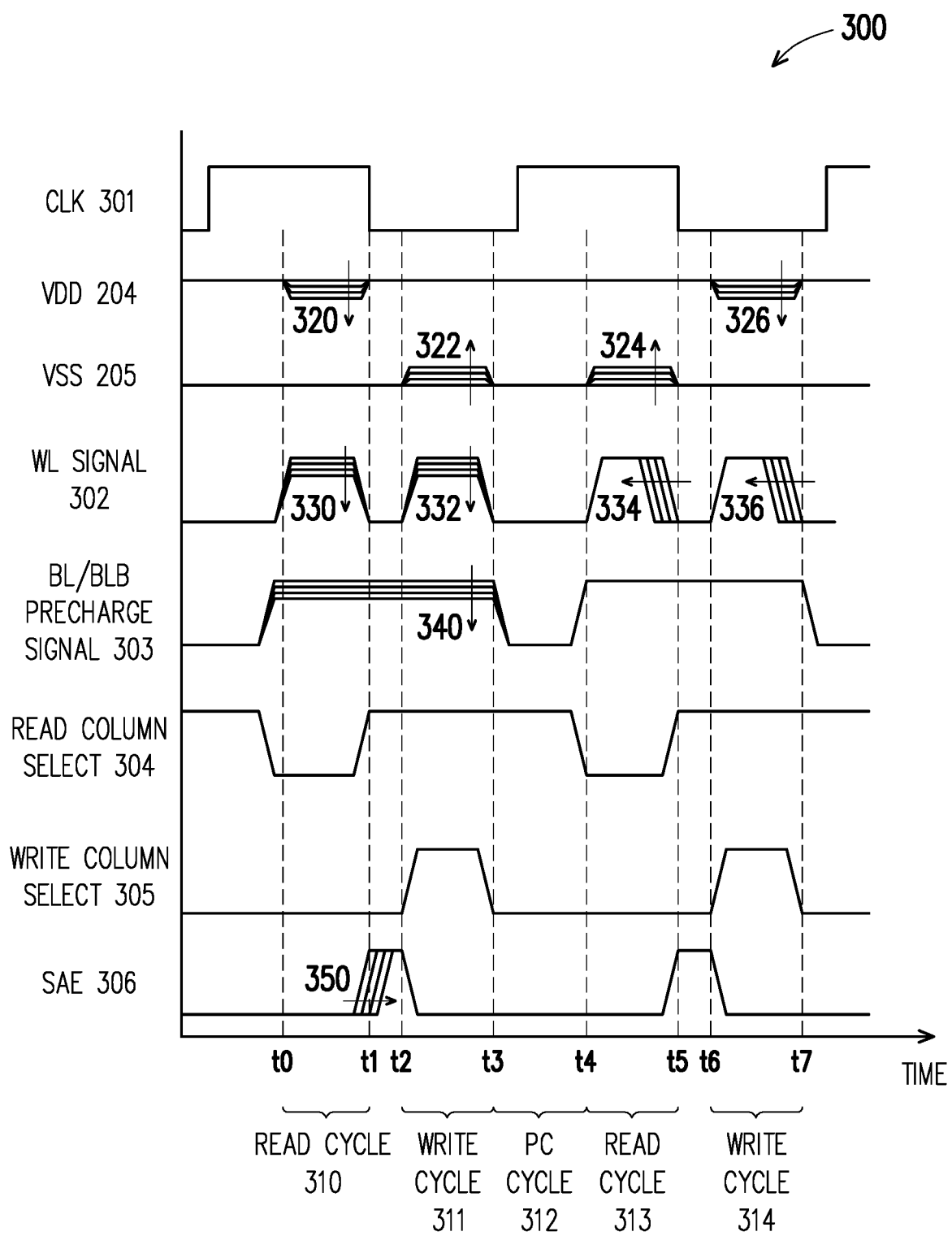
FIG. 3 illustrates waveforms of signals used to provide stressed reading/writing techniques to a PUF cell array comprising a plurality of bit cells to generate PUF signatures, in accordance with various embodiments of the present disclosure.

To recap, each bit cell of the PUF cell array has either a strong intrinsic tendency or a weak intrinsic tendency, in accordance with various embodiments. When a bit cell has a strong intrinsic tendency, the bit cell is categorized as a stable bit cell and accordingly having a preferred logical state. When a bit cell has a weak intrinsic tendency, the bit cell is categorized as an unstable bit cell and thus having no preferred logical state. In some embodiments, a stability of a bit cell (i.e., either stable or unstable) may be determined by the "stressed reading/writing" techniques. FIG. 3 is directed to the discussions of using "stressed write/read" techniques to determine each bit cell's intrinsic tendency when there are lack of strong write or read signals. Since these techniques are performed by one or more of the components described in FIGS. 1-2B, the following discussions of FIG. 3 will be provided in conjunction with FIGS. 1-2B.

FIG. 3 illustrates waveforms of signals used to provide stressed reading/writing techniques to a PUF cell array 102 to generate PUF signatures, in accordance with various embodiments of the present disclosure. A clock signal (CLK) 301 is used as the reference for the other signals in FIG. 3. A word line (WL) signal 302 on WL 206 pulses up two times per clock period of CLK 301. In some embodiments, a first pulse can be used during a read cycle 310 and 313 as a word line select for performing a read operation, while a second pulse may be used during a write cycle 311 and 314 as a word line select for performing a write operation.

A bit line (BL) pre-charge signal 303 may be used to perform bit line pre-charges during a pre-charge cycle 312 to prepare the BL 202 and BLB 203 of FIG. 2B for a pending read operation. A read column select signal 304 illustrates the timing of the column select signals that are used to select between sets of bit line signals for processing by a sense amplifier 116 during a read cycle 310 and 313. A write column select signal 305 illustrates the timing of the write column select signals that are used to select between sets of bit line signals to be used for writing data during a write cycle 311 and 314. A sense amplifier enable (SAE) 306 is used to enable the sense amplifier 116 of FIG. 1. The SAE 306 is performed at the very end of a read cycle 310 and 313 to allow maximum charge transfer onto the bit lines prior to sensing the bit line value.

FIG. 3 further illustrates exemplary signals present of the BL 202, BLB 203, VDD 204, GND 205 and WL 206 when a logical state of the bit cell 200 is written and read out using a stressed write/read method, in accordance with various embodiments of present disclosure. A stressed write/read method can be achieved by limiting one or more parameters including the VDD value, GND value, WL voltage value, WL pulse width, BL/BLB pre-charge voltage value, the sense amplifier enable (SAE), etc. During a write/read cycle with recursively limiting at least one of these parameters, initial logical states of bit cells 200 of a PUF cell array 102 can be maintained or flipped depending on the intrinsic tendency of the bit cells. By collecting logical states of bit cells in each recursive write/read cycle which corresponds to one parameter at one particular value in each cycle (e.g., either increased or reduced values compared to its normal value), a PUF signature, i.e., 2-dimensional map of logical states (address vs. cycle) can be generated.

Referring to FIG. 3, generating a PUF signature using a stressed write/read technique on the PUF generator 100 with the PUF cell array 200 presented in FIGS. 1 and 2 can be conducted by modifying the VDD applied during a ready and/or write cycle, including using a reduced VDD 320 during a read cycle, and an increased VDD 326 during a write cycle.

Furthermore, generating a PUF signature using a stressed write/read technique on the PUF generator 100 with the PUF cell array 200 presented in FIGS. 1 and 2 can be also conducted by modifying the WL voltage and pulse width, including using a reduced WL voltage 330 during a read cycle, a reduced WL voltage 332 during a write cycle, a reduced WL pulse width 334 during a read cycle, and a reduced WL pulse width 336 during a write cycle. Furthermore, a reduced BL/BLB pre-charge voltage 340, and a reduced SAE 350 can be also introduced during a write and/or a read cycle, in accordance with various embodiments of the present disclosure. FIG. 3 shows a number of parameters that can be recursively limited using this technique to generate a PUF signature. However, it should be noted that at least one parameter is needed and performing this technique using a combination of a plurality of parameters are within the scope of this invention. Although only 4 steps in recursively limiting aforementioned parameters are shown in FIG. 3 as indicated by the arrows in 2 write/read cycles, any numbers of steps and write/read cycles can be utilized and are within the scope of this invention which can be controlled by the PUF control circuit 114 and timing control circuit 106 of the authentication circuit 104 in FIG. 1.

In some embodiments, to perform a stressed write on a bit cell 200, a reduced VDD 326 can be introduced during a write cycle, in accordance with various embodiments. Similarly, before the bit cell 200 is written with a logical state under a reduced VDD 326, the bit cell 200 is already written with a first logical state. In some embodiments, the PUF control circuit 114 applies a first voltage (e.g., VDD), corresponding to the first logical state, on the BL 202 so as to write the first logical state to the bit cell 200. In some embodiments, as shown, at time "t6," the VDD 204 is in advance pulled up to VDD, and the BL 202 and BLB 203 are each pre-charges to VDD during or after the first logical state is written. At time "t6," the PUF control circuit 114 then pulls up the WL voltage 206 to VDD so as to turn on the access transistors (e.g., M1 and M6) of the bit cell 200. In some embodiments, at time "t6," the PUF control circuit 114 may reduce the VDD 204 from VDD to the "reduced VDD," as shown, and to write a second logical state to the bit cell 200 through the BL 202 and BLB 203, wherein the second logical state is complementary to the first logical state. In some embodiments, the reduced VDD is about 70% VDD to about 90% VDD.

Operating the bit cell 200 under such a reduced VDD when the bit cell 200 is written to may result in a stressed write for the bit cell 200. More specifically, when the bit cell 200 is written under the reduced VDD, an originally stored logical state (i.e., the first logical state in this example) in the bit cell 200 may be subjected to change. For example, when the bit cell 200 originally presents/stores a logical "1" before a write operation with the reduced VDD 326, it is expected to read a logical "1" from the bit cell 200. However, in some embodiments, the reduced VDD 326 may cause the bit cell 200 to be overwritten with a logical state that is complementary to the expected logical state, i.e., a logical "0". That is, under the reduced VDD 326, the expected logical state, also the first logical state, may be overwritten by the second logical state and thus flip. In some embodiments, such a flipping of the logical state under the reduced VDD 326 when the bit cell 200 is written with a complementary logical state may cause the bit cell 200 to be categorized as having a strong intrinsic tendency, and such flipped logical state (i.e., the logical "0" in this example) may represent the bit cell 200's preferred logical state.

Following the above-described operations, the PUF control circuit 114 is configured to provide the reduced VDD 326 to each bit cell 200 of the PUF cell array 102 so as to determine each bit cell's logical state across the PUF cell array 102 during each write/read cycle. In some embodiments, after the write operation under the reduced VDD 326, the PUF control circuit 114 is configured to read out the logical state of each bit cell 200 of the PUF cell array 102 so as to use the logical states (i.e., the preferred logical states of the stable bit cells) of the bit cells to generate a PUF signature for the corresponding write cycle under the corresponding reduced VDD value. During the following write cycles, the stability and preferred logical states of the bit cells 200 of the PUF cell array 102 are further determined at further reduced VDD and a PUF signature can be generated for each write cycle. In some embodiments, the PUF control circuit 114 may also determine the number of bit cells 200 that have flipped their logical states and the process to generate a PUF signature using a reduced VDD 326 is terminated when over 50% of bit cells have flipped their logical states.

In some embodiments, to perform a stressed write on a bit cell 200, a decreased WL voltage 332 can be introduced during a write cycle, in accordance with various embodiments. In some embodiments, the bit cell 200 is previously charged to a logical state. In some embodiments, this initial logical state of the bit cell 200 can be a high logical state i.e., "1". In some embodiments, before the bit cell 200 is written at time "t2," the PUF control circuit 114 turns on the bit cell 200 by pulling up the VDD 204 to VDD, and pre-charges the BL 202 and BLB 203 to VDD. When the bit cell 200 is write at time "t2," the PUF control circuit 114 may reduce the WL voltage 332 to a value lower than VDD, i.e., "reduced WL voltage 332," as shown in FIG. 3. In some embodiments, the reduced WL voltage 332 is about 50% VDD to about 70% VDD. When the bit cell 200 is written using a reduced WL voltage 332, an originally stored logical state, i.e., "1", in a bit cell 200 that has a high tendency to flip may be subjected to change during the first write cycle 311, which is substantially similar to the flipping of the originally stored logical state. In some embodiment, the originally stored logical state in a bit cell 200 that does not have a high tendency to flip may stay unchanged during the same write cycle 311.

Thus, the PUF control circuit 114 may determine the bit cell 200's preferred logical state, when a stressed write is performed. In some embodiments, the PUF control circuit 114 may provide the reduced WL voltage 332 to each bit cell of the PUF cell array 102 so as to identify each bit cell logical state across the PUF cell array 102, and in some embodiments, use the identified logical state across the PUF cell array 102 to generate a PUF signature which comprises bit cell positions (i.e., address) and time (i.e., write/read cycle) when they flip their original logical states (e.g., from 1 to 0 or from 0 to 1) when a reduced WL voltage is applied. During the following write/read cycles, the stability and preferred logical states of the bit cells 200 of the PUF cell array 102 are further determined at further reduced WL voltage and a PUF signature can be generated for each write cycle. In some embodiments, the authentication circuit 104 may also determine the number of bit cells 200 that have flipped their logical states and the process to generate a PUF signature using a reduced WL voltage 332 is terminated when over 50% of bit cells have flipped their logical states.

In some embodiments, to perform a stressed write on a bit cell 200, a decreased WL pulse width 336 can be introduced during a write cycle, in accordance with various embodiments. Similarly, before the bit cell 200 is written with a logical state under a decreased WL pulse width 336, the bit cell 200 is already written with a first logical state. In some embodiments, the PUF control circuit 114 applies a first voltage (e.g., VDD), corresponding to the first logical state, on the BL 202 so as to write the first logical state to the bit cell 200. In some embodiments, before the first voltage is applied to the BL 202, the PUF control circuit 114 may cause the timing control circuit 106 to turn on the access transistors M1 210 and M6 215 for a predetermined duration. In some embodiments, as shown, at time "t6," the VDD 204 is in advance pulled up to VDD, and the BL 202 and BLB 203 are each pre-charges to VDD during or after the first logical state is written. In some embodiments, at time "t6," the PUF control circuit 114 and the timing control circuit 124 pull up the WL voltage to VDD but with a decreased WL pulse width 336, so as to weakly turn on the access transistors (e.g., M1 210 and M6 215) of the bit cell 200.

Operating the bit cell 200 under such a decreased WL pulse width 336 when the bit cell 200 is written to may result in a reduced write margin for the bit cell 200. More specifically, when the bit cell 200 is written to under the decreased WL pulse width 336, an originally stored logical state (i.e., the first logical state in this example) in the bit cell 200 may be subjected to change. For example, when the bit cell 200 originally presents/stores a logical "1" before a write operation with the reduced write margin, it is expected to read a logical "1" from the bit cell 200. However, in some embodiments, the decreased WL pulse width 336 may cause the bit cell 200 to be overwritten with a logical state that is complementary to the expected logical state, i.e., a logical "0". That is, under the decreased WL pulse width 336, the expected logical state, also the first logical state, may be overwritten by the second logical state and thus flip. In some embodiments, such a flipping of the logical state under the decreased WL pulse width 336 when the bit cell 200 is written with a complementary logical state may cause the bit cell 200 to be categorized as having a strong intrinsic tendency, and such flipped logical state (i.e., the logical 0 in this example) may represent the bit cell 200's preferred logical state.

Following the above-described operations, the PUF control circuit 114 and the timing control circuit 106 are configured to provide the decreased WL pulse width 336 to each bit cell of the PUF cell array 102 so as to determine each bit cell's logical state across the PUF cell array 102. In some embodiments, after the write operation under the reduced WL pulse width 336, the PUF control circuit 114 is configured to read out the logical state of each bit cell 200 of the PUF cell array 102 so as to use the logical states (i.e., the preferred logical states of the stable bit cells) of the bit cells to generate a PUF signature for the corresponding write cycle under a corresponding reduced WL pulse width value. During the following write cycles, the stability and logical states of the bit cells 200 of the PUF cell array 102 are further determined at further reduced WL pulse width 336 and a PUF signature can be generated for each write cycle. In some embodiments, the PUF control circuit 114 may further determine the number of bit cells 200 that have flipped their logical states and the process to generate a PUF signature using a reduced WL pulse width 336 is terminated when over 50% of bit cells have flipped their logical states.

Alternatively, the PUF control circuit 114, together with the timing control circuit 106, may also perform a stressed read during a read/write cycle to determine each bit cell's logical state and to generate a PUF signature. In some alternative embodiments, the PUF control circuit 114 may perform a hybrid stressed write/read technique to determine each bit cell's logical state and to generate a PUF signature. For example, using the circuit diagram of the PUF cell array in FIG. 2A as an example, the PUF controller 114 may read logical states of the bit cells along column A at a reduced VDD 320, similarly as described with respect to FIG. 3, so as to determine the stability of each bit along column A. In some other embodiments, the PUF control circuit 114 may read a logical state of the bit cells along column B under a reduced WL voltage 330, as described with respect to FIG. 3, so as to determine the stability of each bit cell along column B. In certain embodiments, the PUF control circuit 114 may also read a logical state of the bit cells along column C under a decreased WL pulse width 334, as described with respect to FIG. 3, so as to determine the stability of each bit cell along column C.

In some embodiments, this PUF signature generated using a stressed write/read technique comprises a two-dimensional map of logical states (i.e., bit cell's address versus write/read cycle), especially for smallest macro and smallest challenge response pairs. In another embodiment, a PUF signature can be addresses of bit cells at a particular cycle when more than 50% of total bit cells have flipped their original logical states.

Figure 4:
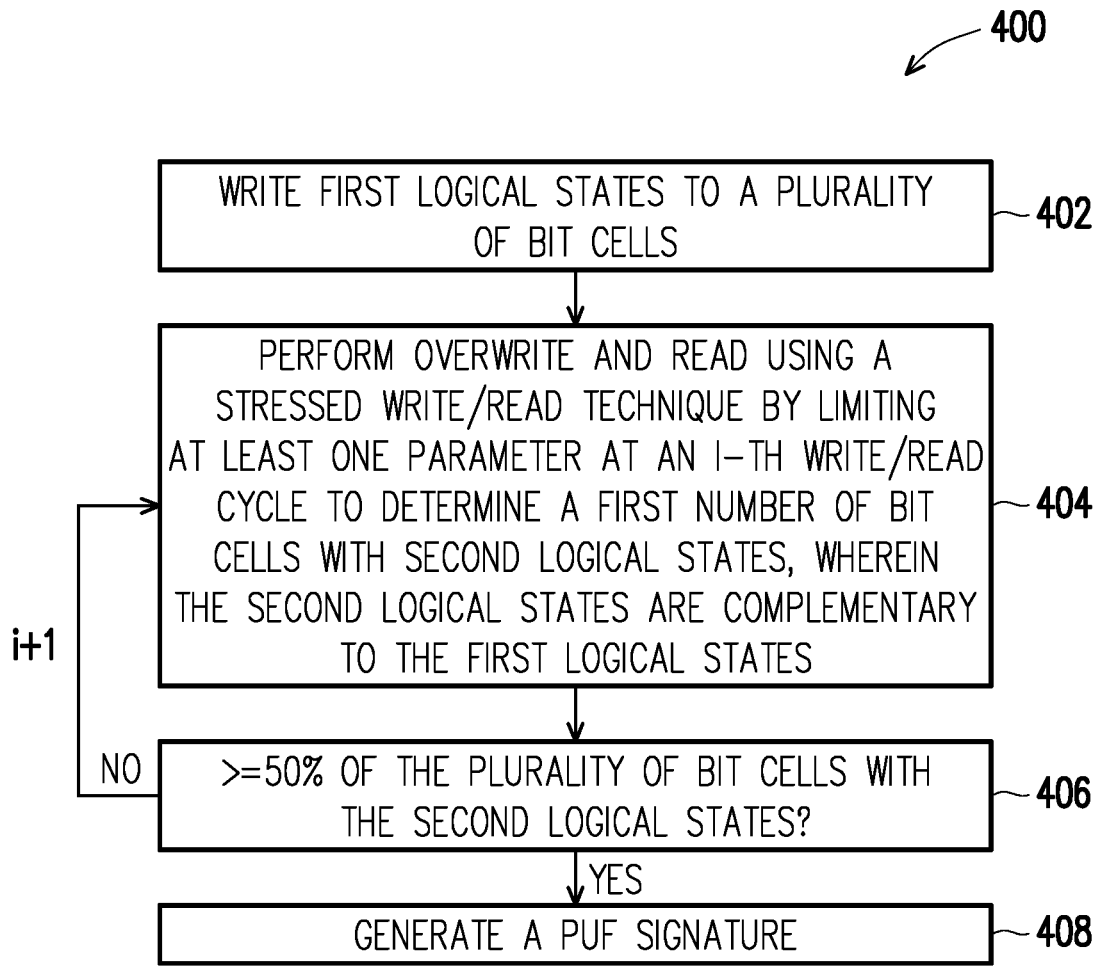
FIG. 4 illustrates a flow chart of a method used to provide a stressed write/read technique to a PUF cell array comprising a plurality of bit cells to generate PUF signatures, in accordance with various embodiments of the present disclosure.

FIG. 4 illustrates a flow chart of a method 400 used to provide a stressed write/read technique to a PUF cell array 102 to generate PUF signatures, in accordance with various embodiments. In various embodiments, the operations of method 400 are performed by the respective components illustrated in FIGS. 1-3. For purposes of discussion, the following embodiment of the method 400 will be described in conjunction with FIGS. 1-3. The illustrated embodiment of the method 400 is merely an example. Therefore, it should be understood that any of a variety of operations may be omitted, re-sequenced, and/or added while remaining within the scope of the present disclosure.

The method 400 starts with operation 402 in which each bit cell of the PUF cell array 102 is written with background data (i.e., a first logical state in each of the bit cells of the PUF cell array), in accordance with various embodiments. In an example, referring again to FIG. 1, in response to a challenge received, the PUF control circuit 114 may turn on all the bit cells by pulling up each bit cell's VDD 204 to a nominal voltage (e.g., VDD), and, in some embodiments, access a plural WL's (e.g., 206-1, 206-2, 206-3, etc. of FIG. 2A) row by row so as to enable the respective bit cells on the row to be written with the first logical state.

The method 400 continues to operation 404 in which the first logical states (i.e., the first logical state) are overwritten or read out from the bit cells using a stressed write/read technique by limiting at least one parameter at an i-th write/read cycle to determine a first number of bit cells that have flipped the first logical states to second logical states, in accordance with various embodiments. In some embodiments, the second logical state is complementary to the first logical state. For example, if a bit cells is configured with a first logical state "1" and if the bit cell is read as a second logical state of "0", the bit cell is known as "flipped". As described above, one or more stressed read/write may be performed by the PUF controller 114 and the timing control circuit 106 to cause each bit cell 200 to be read or write under a stressed read/write conditions. For example, the PUF control circuit 114 may provide a reduced VDD VDD, as shown and discussed in FIG. 3 in a write/read cycle. Alternatively, the PUF control circuit 114 may provide a reduced WL voltage to each bit cell, as shown and discussed in FIG. 3. Alternatively, the PUF control circuit 114 and the timing control circuit 106 may provide a reduced WL pulse width to each bit cell. Under such stressed read/write, the first logical state that is originally written to each bit cell may be read out differently. Alternatively, the PUF control circuit 114 may overwrite the first logical state with a second logical state. The PUF control circuit 114 may further perform a stressed read which may result in a logical state different from the second logical state. Continuing with the above example, the PUF control circuit 114 reads out each bit cell's logical state so as to detect whether the first logical state has flipped to a second logical state that is complementary to the first logical state using a stressed write technique, or to detect whether the second logical state has flipped to a first logical state that is complementary to the second logical state using a stressed read technique.

In some embodiments, before continuing with operation 406, operation 404 can be repeated multiple times in a plurality of consecutive write/read cycles under a constant stressed write/read setting to obtain a histogram (i.e., a frequency plot) of logical states of each bit cell 200. The histogram is used as an accurate representation of the distribution of logical states of each bit cell 200 within a number of challenge-response (CR) cycles. In some embodiments, if over and equal to 70% of logical states collected from a bit cell 200 over a plurality of CR cycles is either "1" or "0", then the bit cell 200 is considered to be stable and that particular logical state is used as the logical state of the bit cell 200. In some embodiments, if there are less than 70% of logical states collected from a bit cell 200 over a plurality of CR cycles is either "1" or "0", then the bit cell is considered to be unstable and will be abandoned or excluded from being used as part of the PUF signature. As mentioned above, a PUF signature is unique to the PUF cell array 102 because of the logical states of each bit cell and its tendency to flip under stressed write/read condition. Such a unique PUF signature may become more reliable if the PUF signature is generated based on stable bit cells of the PUF cell array 102. The disclosed PUF control circuit 114 uses one or more stressed write/read techniques by limiting one or more parameters recursively to detect the logical states and thus the generated PUF signature using the identified stable bit cells is reliable.

The method 400 continues to operation 406 in which a total number of bit cells with second logical states is compared to the total number of bit cells in the PUF cell array. In some embodiments, if there are less than 50% bit cells in the PUF cell array which have second logical states that are different from the first logical states, the method 400 proceeds to operation 404 to further determine the logical states by further limiting at least one parameters in an i+1 read/write cycle. The PUF control circuit 114 determines the logical states of bit cells and the number of bit cells that have flipped logical states, in some embodiments. Operations 404-406 repeats until the number of bit cells that have flipped logical states are equal or more than 50% of the total number of bit cells in the PUF cell array. The method 400 then continues to operation 408 to assemble a PUF signature using logical states of bit cells from each read/write cycle. In some embodiments, the PUF signature is the logical states of bit cells from the last read/write cycle.

Figure 5A:
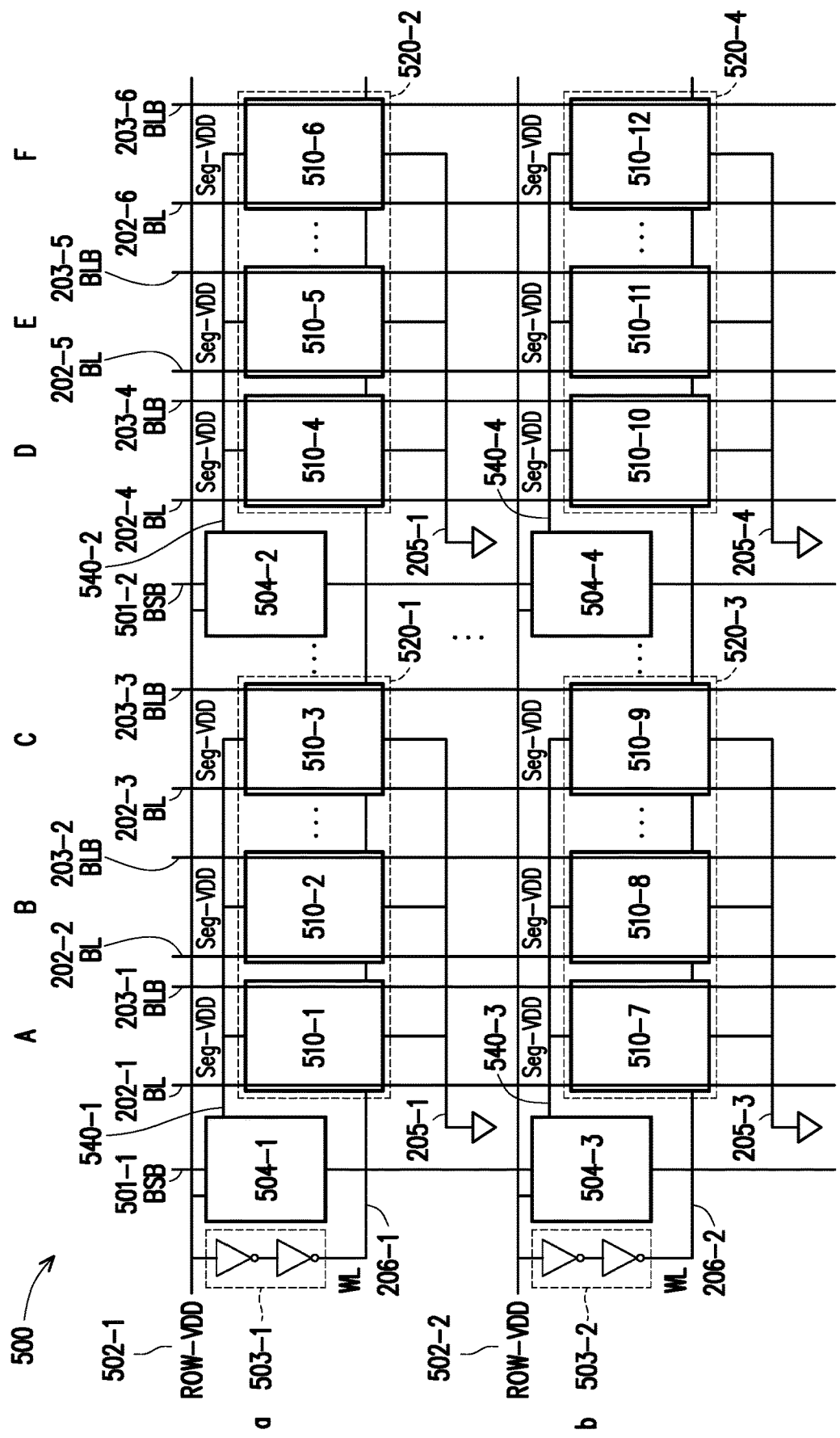
FIG. 5A illustrates an exemplary circuit diagram of a PUF cell array comprising a plurality of bit cells, in accordance with various embodiment of present disclosure.

FIG. 5A illustrates an exemplary circuit diagram of a PUF cell array 500, in accordance with various embodiment of present disclosure. In some embodiments, the PUF cell array 500 includes a plurality of bit cells 510-1, 510-2, 510-3, 510-4, 510-5, 510-6, 510-7, 510-8, 510-9, 510-10, 510-11, and up to 510-12. Although only 12 bit cells are shown, any desired number of bit cells may be included in the PUF cell array 500 while remaining within the scope of the present disclosure. As described above, the bit cells 510-1, 510-2, 510-3, 510-4, 510-5, 510-6, 510-7, 510-8, 510-9, 510-10, 510-11, and 510-12 are arranged in a column-row configuration. More specifically, in some embodiments, the PUF cell array 500 includes bit lines (BL's) 202-1, 202-2, 202-3, 202-4, 202-5, 202-6 arranged in parallel, bit line bars (BLB's) 203-1, 203-2, and 203-3, 203-4, 203-5, 203-6 also arranged in parallel, and word lines (WL's) 206-1, and 206-2, arranged in parallel orthogonally to the BL's and BLB's. In some embodiments, the PUF cell array 500 also includes VDD lines 204-1, 204-2, 204-3, 204-4, 204-5, 204-6, 204-7, 204-8, 204-9, 204-10, 204-11, 204-12, and GND lines 205-1, 205-2, 205-3, 205-4, 205-5, 205-6, 205-7, 205-8, 205-9, 205-10, 205-11, 205-12. As such, the PUF cell array 500 may include a first plurality of columns (e.g, arranged vertically), a second plurality of rows (e.g., arranged horizontally), wherein each column includes a respective pair of BL 202, BLB 203, VDD line 204, GND line 205, and each row includes a respective WL 206.

For example, as shown in the illustrated embodiment of FIG. 5A, the PUF cell array 500 includes columns "A," "B," "C," "D," "E," and "F," and rows "a," and "b," wherein bit cells 510-1, 510-2 and 510-3 in columns "A," "B," and "C" of row "a" form a bit cell block 520-1, bit cells 510-4, 510-5 and 510-6 in columns "D," "E," and "F" of row "a" form a bit cell block 520-2, bit cells 510-7, 510-8 and 510-9 in columns "A," "B," and "C" of row "b" form a bit cell block 520-3, and bit cells 510-10, 510-11 and 510-12 in columns "D," "E," and "F" of row "b" form a bit cell block 520-4. Although only one block with one row is illustrated in FIG. 5A, any desired number of rows may be included in a bit cell block 520 while remaining within the scope of the present disclosure.

Bit cell block 520-1 includes respective BLs 202-1, 201-2, 202-3, BLB 203-1, 203-2, 203-3, VDD lines 204-1, 204-2, 204-3, and GND lines 205-1, 205-2, 205-3; bit cell block 520-2 includes respective BLs 202-4, 201-5, 202-6, BLB 203-4, 203-5, 203-6, VDD lines 204-4, 204-5, 204-6, and GND lines 205-4, 205-5, 205-6; bit cell block 520-3 includes respective BLs 202-7, 201-8, 202-9, BLB 203-7, 203-8, 203-9, VDD lines 204-7, 204-8, 204-9, and GND lines 205-7, 205-8, 205-9; and bit cell block 520-4 includes respective BLs 202-10, 201-11, 202-12, BLB 203-10, 203-11, 203-12, VDD lines 204-10, 204-11, 204-12, and GND lines 205-10, 205-11, 205-12. Row "a" includes a respective ROW_VDD 502-1 and WL 206-1; and row "b" includes a respective ROW_VDD 502-2 and WL 206-2. In some embodiments, VDD lines 204 of bit cells 510 in a bit cell block 520 are coupled together to a common segment voltage (SEG_VDD 540), which is used to simultaneously provide VDDs to all the bit cells 510 in a bit cell block 520. For example, the VDD lines 204-1, 204-2, and 204-3 of the bit cell block 520-1 are coupled to SEG_VDD 540-1, and the GND lines 205-1, 205-2, and 205-3 of the bit cell block 520-1 are coupled together to GND; the VDD lines 204-4, 204-5, and 204-6 of the bit cell block 520-5 are coupled to SEG_VDD 540-2, and the GND lines 205-4, 205-4, and 205-5 of the bit cell block 520-2 are coupled together to GND; the VDD lines 204-7, 204-8, and 204-9 of the bit cell block 520-3 are coupled to SEG_VDD 540-3, and the GND lines 205-7, 205-8, and 205-9 of the bit cell block 520-3 are coupled together to GND; and the VDD lines 204-10, 204-11, and 204-12 of the bit cell block 520-4 are coupled to SEG_VDD 540-4, and the GND lines 205-10, 205-11, and 205-12 of the bit cell block 520-4 are coupled together to GND.

In some embodiments, each SEG_VDD 540 of each bit cell block 520 are coupled to a block select bar (BSB) 501 through a block select circuit (BSC) 504. The BSB 501 are shared by the bit cell blocks 520 in the same column. In some embodiments, each WL 206 of a row is coupled to ROW_VDD 502 through a row select circuit (RSC) 503. In some embodiments, for a bit cell block 520 that comprises at least one rows, WL's 206 can be directly connect to a single ROW_VDD 502 of the bit cell block 520. In certain embodiments, a bit cell block 520 comprises a plurality of ROW_VDD's 502 that are coupled to a plurality of WL's 206 corresponding to the plurality of rows in the bit cell block 520.

Referring to FIG. 5A, the bit cell blocks 520-1 and 520-3 are coupled to BSB 501-1 through BSC's 504-1 and 504-3, and the bit cell blocks 520-2 and 520-4 are coupled to BSB 501-2 through BSC's 504-2 and 504-4. The WL 206-1 of the bit cell blocks 520-1 and 520-2 are coupled to ROW_VDD 502-1 through RSC 503-1, and the WL 206-2 of the bit cell blocks 520-3 and 520-4 are coupled to ROW_VDD 502-2 through RSC 503-2.

As described above, each bit cell 510 of the PUF cell array 500 (e.g., 510-1, 510-2, 510-3, 510-4, 510-5, 510-6, 510-7, 510-8, 510-9, 510-10, 510-11, 510-12, etc.) may include a plurality of transistors (e.g., six MOSFET's for a 6T-SRAM bit cell, eight MOSFET's for an 8T-SRAM bit, three MOSFET's for an 3T-DRAM bit, etc.) to store a data bit. In some embodiments, such a data bit stored in each bit cell may be written to the bit cell by applying either a high state (i.e., a logical "1") or a low state (i.e., a logical "0") through a corresponding BL, BLB, and/or WL, which will be described in further detail below.

Figure 5B:
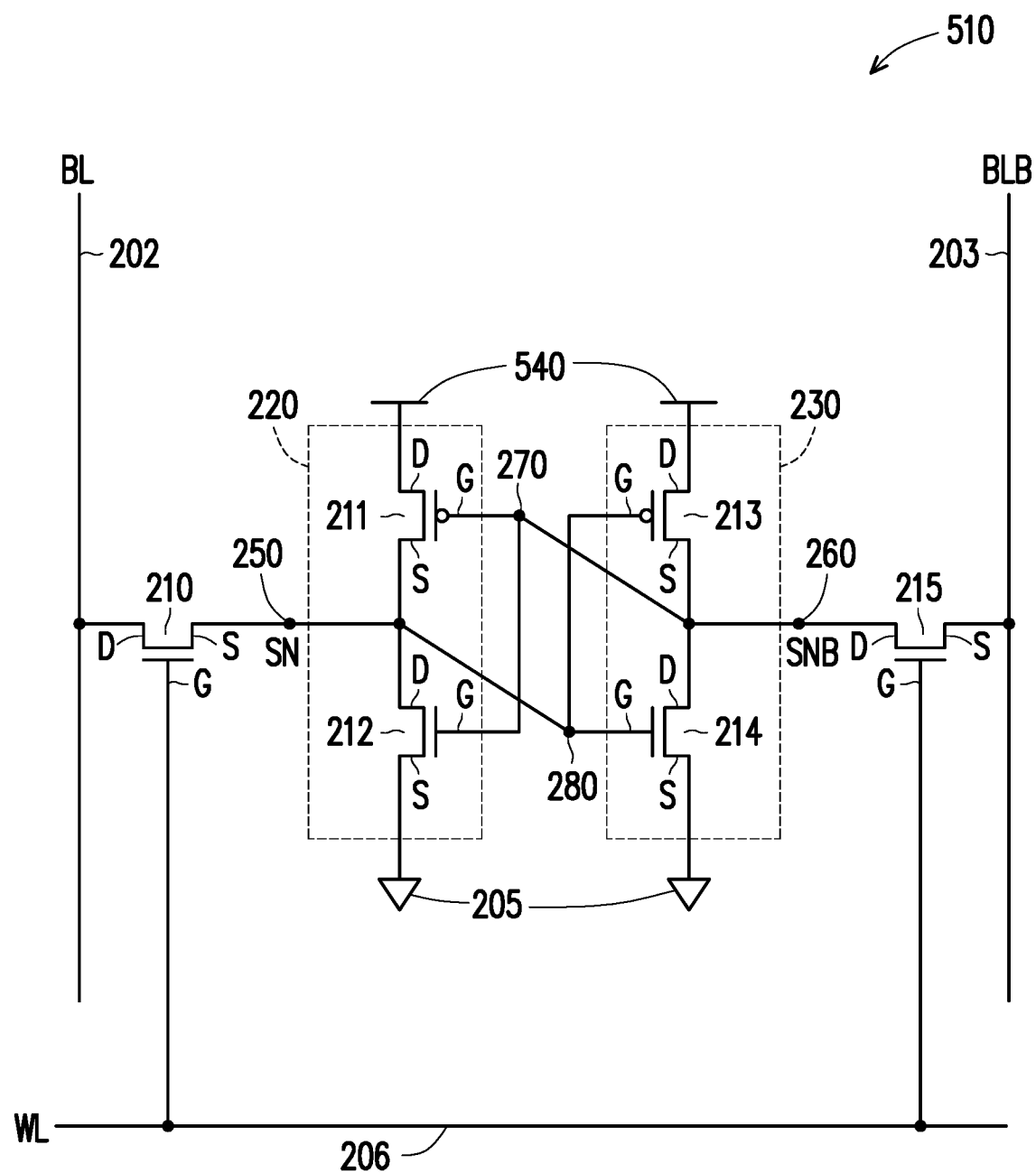
FIG. 5B illustrates an exemplary circuit diagram of a bit cell that is implemented as a 6T-SRAM bit cell, in accordance with various embodiments of the present disclosure.

FIG. 5B illustrates an exemplary circuit diagram of a bit cell 510 that is implemented as a 6T-SRAM bit cell, in accordance with various embodiments of the present disclosure. As shown, the bit cell 510 includes transistors: M1 210, M2 211, M3 212, M4 213, M5 214, and M6 215. Since the bit cells 510 of the PUF cell array 500 are substantially similar to one another, for clarity, the following discussions of configurations and operations of the transistors of the bit cells will be generally directed to the bit cell 510.

In some embodiments, the transistor M2 211 and M3 212 are formed as a first inverter 220 on the left and the transistors M4 213 and M5 214 are formed as a second inverter 230 on the right wherein the first and second inverters 220/230 are coupled to each other. More specifically, source terminal of the transistor M2 211 is coupled with drain terminal of the transistor M3 212 at storage node (SN) 250. Similarly, source terminal of the transistor M4 213 is coupled with drain terminal of the transistor M5 214 at storage node bar (SNB) 260. Terminals G of the transistor M2 211 and M3 212 are coupled together at node 270, while terminals G of the transistors M4 213 and M5 214 are coupled together at node 280. The first and second inverters 220/230 are each coupled between first voltage reference through drain terminal of the transistor M2 211 and M4 213, and second voltage reference 205 through the source terminal of the transistor M3 212 and M5 214. Generally, the first voltage reference is the supply voltage to the bit cell 510. In some embodiments, the first voltage reference is typically referred to as a "VDD". The second voltage reference 205 is typically referred to as the GND 205, e.g., "ground". In some embodiments, the VDD lines of bit cells 510 in a bit cell block is coupled together to SEG_VDD 540 and further coupled to the ROW_VDD 502 through the RSC 504, which is further controlled by the PUF control circuit 114 (FIG. 1). For example, the ROW_VDD 502 may range from about 30% of VDD to about 130% of VDD, wherein VDD is a nominal voltage level applied to each of the bit cells 510 of the PUF cell array 500 when the PUF cell array 500 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215. In addition to being coupled to the inverters 220/230, the transistors M1 210 and M6 215 are both coupled to the WL 206 and each coupled to the BL 202 and BLB 203, respectively. Specifically, gate terminals of the access transistors M1 210 and M6 215 are coupled to the WL 206. Drain terminal of the transistor M1 210 and source terminal of the transistor M6 215 are coupled to BL 202 and BLB 203, respectively. The transistors M1 210 and M6 215 are typically referred to as access transistors of the bit cell 510. In some embodiments, the transistors M1 210, M3 212, M5 214, and M6 215 each includes an NMOS transistor, and M2 211 and M4 213 each includes a PMOS transistor. Although the illustrated embodiments of FIG. 5B shows that M1-M6 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

Figure 5C:
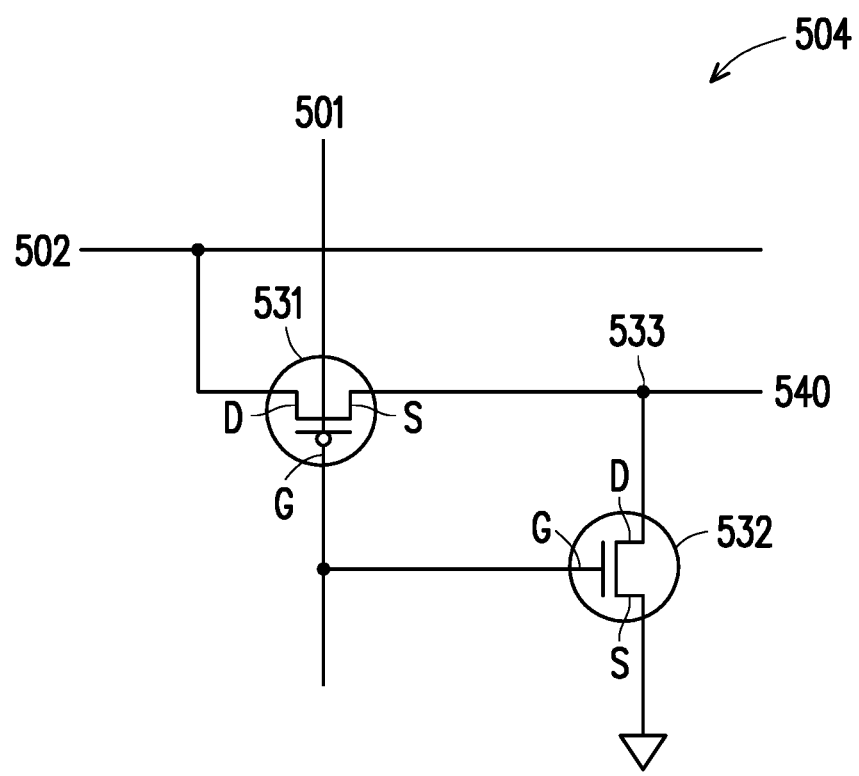
FIG. 5C illustrates an exemplary circuit of a block select circuit (BSB), in accordance with various embodiments of present disclosure.

FIG. 5C illustrates an exemplary circuit of a block select circuit (BSB) 504, in accordance with various embodiments of present disclosure. In the illustrated embodiment, a BSC 504 comprises two transistors 531 and 532, according to certain embodiments. In some embodiments, transistor 531 is a PMOS transistor and transistor 532 is an NMOS transistor. Source terminal of transistor 531 is coupled to drain terminal of transistor 532 at node 533. SEG_VDD 540 is electrically connected to the node 533. Gate terminals of transistors 531 and 532 are coupled together and electrically connected to the BSB 501. Drain terminal of transistor 531 is coupled to ROW_VDD 502 and source terminal of transistor 532 is coupled to GND.

During operation, to select a corresponding block 520, BSB 501 is pulled down to low and ROW_VDD 502 is pulled up to high, the transistor 532 is turned off and the transistor 531 is turned on so as to pull up node 533 to ROW_VDD 502. To deselect a corresponding block 520, BSB 501 is pulled up to high and ROW_VDD 502 is pulled down to low, which then turns off the transistor 532 and turn on the transistor 531 so as to pull down node 533 to GND, terminating power supply to the corresponding block 520. For example, referring to FIG. 5A, in order to select block 520-1, BSB 501-1 is pulled down and ROW_VDD 502-1 is pulled up, while BSB 501-2 is pulled up and ROW_VDD 502-2 is pulled down to power off all the other bit cell blocks 520 (i.e., 520-2, 520-3 and 520-4). Similarly, any other bit cell block can be individually powered up or powered down to generate a PUF signature. In some embodiments, a plurality of bit cell blocks 520 can be powered up to generate a PUF signature. In this embodiment, challenge is a block address (i.e., a ROW_VDD address and a BSB address).

Referring to FIG. 5B, when a bit cell 510 (e.g., 510-1, 510-2, 510-3, 510-4, etc.) presents/stores a data bit, a first node 250 of the bit cell 510 is configured to be at a first logical state ("1" or "0"), and a second node 260 of the bit cell 510 is configured to be at a second logical state ("0" or "1"), wherein the first and second logical states are complementary with each other. In some embodiments, the first logical state at the first node 250 is the data bit stored by the bit cell 510. For example, in the illustrated embodiment of FIG. 5B, the bit cell 510 includes nodes 250 and 260. When the bit cell 510 presents a data bit (e.g., a logical "1"), the node 250 is configured to be at the logical "1", and the node 260 is configured to be at the logical "0".

More specifically, such a data bit may be written to the bit cell 510 in a bit cell block 520 by using corresponding BL 202, BLB 203, BSB 501, ROW_VDD 502, GND line 205, and WL 206. As a representative example, to write a logical "1" to a bit cell 510, in some embodiments, the PUF control circuit 114 pulls up the ROW_VDD 502 to a desired value, e.g., VDD. Then the PUF control circuit 114 pulls up the WL 206 to a desired "WL voltage", e.g., VDD, so that the access transistors M1 210 and M6 215 are turned on. More specifically, the WL 206 remains at the WL voltage for a certain period of time, hereinafter "WL pulse width", which may be controlled by the timing control circuit 106. During the WL pulse width (i.e., transistors M1 210 and M6 215 remain on), the BL 202 and the BLB 203 are each applied with a first voltage (e.g., VDD) corresponding to a high logical state and a second voltage (e.g., ground) corresponding to a low logical state, respectively, to write a logical "1" to the node 250 and a logical "0" to the node 260. On the other hand, to read out the written, or stored, logical state from the bit cell 510, in some embodiments, the PUF control circuit 114 pulls up the ROW_VDD 502 of the bit cell 510 to about VDD. The PUF control circuit 114 then pre-charges the BL 202 and BLB 203 to VDD. The PUF control circuit 114 pulls up the WL 206 to the desired WL voltage (e.g., VDD), so that the access transistors M1 210 and M6 215 are turned on. Accordingly, the logical state stored in the bit cell 510 is read out by comparing either a voltage difference or a current difference between the BL 202 and the BLB 203.

In some embodiments, the read-out operation may be performed by the PUF control circuit 114 (FIG. 1). As such, the PUF control circuit 114 may be connected to one or more input/output (I/O) circuits such as, for example, sensing amplifier(s) 116, etc., to perform such a functionality. In some other embodiments, the one or more I/O circuits 112 may be implemented as an independent circuit block. For example, the one or more I/O circuits 112 may be integrated into the PUF cell array 102, as shown in FIG. 1.

Traditionally, to generate a PUF signature using a normal SRAM-based PUF generator needs to power-up/power down all the bit cells with in the PUF cell array. In this present disclosure, at least one bit cell block 520 (i.e., segment) within the entire PUF cell array 102 can be selected while keeping others turned off. Therefore, this technique requires no modification to the normal SRAM based PUF generators. Moreover, this technique requires no special read/write circuits to perform a normal write/read operation. Furthermore, it requires power cycling the entire array to establish PUF signatures and allows the use of SRAM based PUF generators under normal operation mode. This technique provides advantages, such as a low active power, fast challenge response, etc.

In some embodiments, once at least one bit cell block address is selected, bit cells 510 within the bit cell blocks 520 are powered down and then powered up similar to a normal SRAM-based PUF generator. Structurally, two cross-coupled inverters 220 and 230 are symmetrical in a bit cell 510. The transistors in the cross-coupled inverters 220 and 230 have mismatches due to variations caused in manufacturing processes. The small mismatches in the cross-coupled inverters 220/230 as well as in the voltage levels at the nodes SN/SNB 250/260 will be amplified by the positive feedback of the cross-coupled inverters 220/230 and will eventually generate a preferred logical state, either logical "1" or logical "0", which is known as a "self-sensing" process. Assuming random device variations, the bit cells 510 in the at least one bit cell block 520 each generates a preferred logical state. This makes a binary output string (i.e., logical states and bit cell address) read from all bit cells 510 within the at least one bit cell block 520 instead of the entire PUF cell array 500 unique, random and non-traceable.

Figure 6:
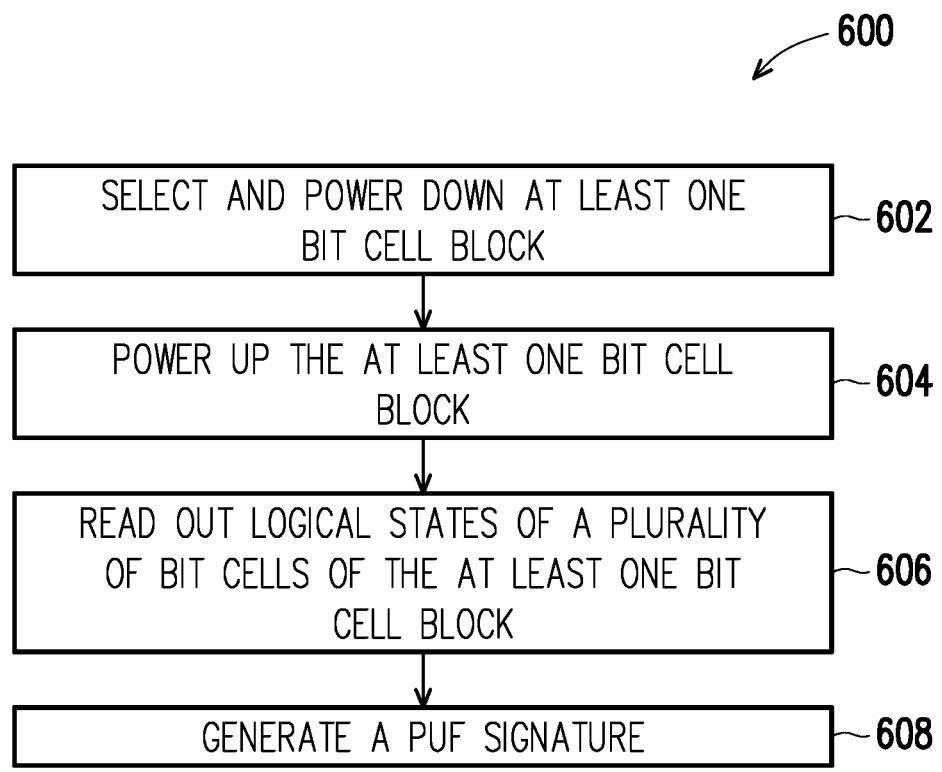
FIG. 6 illustrates a flow chart of a method to generate PUF signatures based on a PUF cell array comprising a plurality of bit cells, in accordance with various embodiments of present disclosure.

FIG. 6 illustrates a flow chart of a method 600 to generate PUF signatures based on a PUF cell array 500, in accordance with various embodiments of present disclosure. In various embodiments, the operations of method 600 are performed by the respective components illustrated in FIGS. 1 and 5A-C. For purposes of discussion, the following embodiment of the method 600 will be described in conjunction with FIGS. 1 and 5A-C. The illustrated embodiment of the method 600 is merely an example. Therefore, it should be understood that any of a variety of operations may be omitted, re-sequenced, and/or added while remaining within the scope of the present disclosure.

The method 600 starts with operation 602 in which at least one bit cell block 520 is first selected, in accordance with various embodiments. In an example, referring again to FIG. 5A, in response to a challenge (i.e., a block address) received from the PUF control circuit 114 to power down all the bit cells 510 in the at least one bit cell block 520 by pulling down the corresponding ROW_VDD 502 to GND, and, in some embodiments pulling up the corresponding BSB 501 to a nominal voltage (e.g., VDD), so as to select and power down the at least one bit cell block 520.

The method 600 continues with operation 604 in which the at least one bit cell block 520 is powered up, in accordance with various embodiments. Referring to FIGS. 1 and 5C, the PUF control circuit 114 may turn on all the bit cells 510 in the at least one bit cell block 520 by pulling up the corresponding ROW_VDD 502 to a nominal voltage (e.g., VDD), and, in some embodiments, pulling down the corresponding BSB 501 to GND, so as to power up the selected at least one bit cell block 520. Alternatively, the PUF control circuit 114 may provide a WL voltage to each bit cell 510 of the at least one bit cell block 520.

The method 600 continues with operation 606 in which a logical state for each bit cells 510 of the at least one bit cell block 520 is detected, in accordance with various embodiments. Continuing with the above example, the PUF control circuit 114 reads the logical state of each bit cells 510 of the at least one bit cell block 520 by activating the corresponding WL 206. Referring to FIG. 5B, each cross-coupled inverters 220/230 are intrinsically different due to the variations in manufacturing processes and small differences in the cross-coupled inverters 220/230 are amplified by the positive feedback of the cross-coupled inverters and eventually depending on the initial input difference on the SN/SNB 250/260 and the strength of the inverters, a logical "1" or "0" is generated for the bit cell 510. The PUF control circuit 114 uses the logical states of the bit cells 510 across the at least one bit cell block 520 to generate a PUF signature. As mentioned above, a PUF signature, generated based on one or more intrinsic randomness of a plurality of bit cells in at least one bit cell block, is unique to the PUF cell array.

In some embodiments, operations 602, 604 and 606 can be repeated in order to obtain a histogram (i.e., a frequency plot) of logical states of bit cells 510 within the at least one bit cell block 520. The histogram is used as an accurate representation of the distribution of logical states of bit cells within a plurality of powering up/down cycles. In some embodiments, if over 70% of logical states collected of a bit cell is either 1 or 0, then the bit cell is considered to be stable, and the statistically dominant logical state is used as the logical state of the bit cell. In some embodiments, if equal or less than 70% of logical states collected on a bit cell is either 1 or 0, then the bit cell is considered to be unstable and will be abandoned or excluded from being used as part of the PUF signature.

Figure 7A:
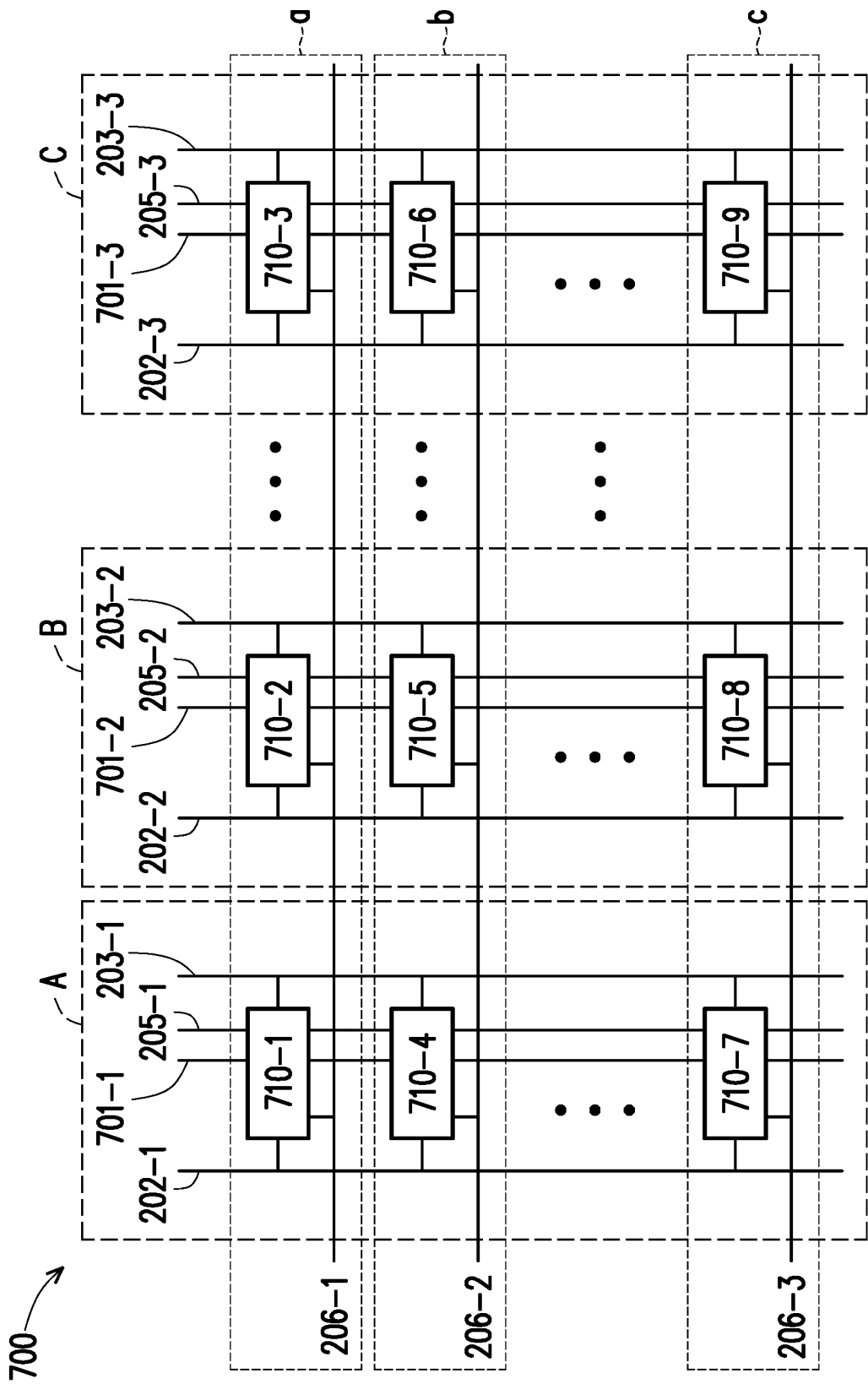
FIG. 7A illustrates an exemplary circuit diagram of a PUF cell array comprising a plurality of bit cells, in accordance with various embodiment of present disclosure.

FIG. 7A illustrates an exemplary circuit diagram of a PUF cell array 700, in accordance with various embodiment of present disclosure. In some embodiments, the PUF cell array 700 includes a plurality of bit cells 200-1, 200-2, 200-3, 200-4, 200-5, 200-6, 200-7, 200-8, and up to 200-9. Although only 9 bit cells are shown, any desired number of bit cells may be included in the PUF cell array 700 while remaining within the scope of the present disclosure. As described above, the bit cells 200-1, 200-2, 200-3, 200-4, 200-5, 200-6, 200-7, 200-8, and 200-9 are arranged in a column-row configuration. More specifically, in some embodiments, the PUF cell array 700 includes bit lines (BL's) 202-1, 202-2, and 202-3 arranged in parallel, bit line bars (BLB's) 203-1, 203-2, and 203-3 also arranged in parallel, and word lines (WL's) 206-1, 206-2, and 206-3 arranged in parallel orthogonally to the BL's 202 and BLB's 203. In some embodiments, the PUF cell array 700 also includes positive supply voltage power (i.e., VDD lines) 701-1, 701-2, and 701-3 for each column, which is referred as "column VDD" (CVDD). As such, the PUF cell array 700 may include a first plurality of columns (e.g, arranged vertically), a second plurality of rows (e.g., arranged horizontally), wherein each column includes a respective pair of BL 202, BLB 203, CVDD 204, and each row includes a respective WL 206.

For example, as shown in the illustrated embodiment of FIG. 7A, the PUF cell array 700 includes columns "A," "B," and "C," and rows "a," "b," and "c," wherein column A includes respective BL 202-1, BLB 203-1, and CVDD 701-1; column B includes respective BL 202-2, BLB 203-2, and CVDD 701-2; column C includes respective BL 202-3, BLB 203-3, and CVDD 701-3; row a includes a respective WL 206-1; row b includes a respective WL 206-2; and row c includes a respective WL 206-3.

Moreover, each column includes one or more bit cells that are each coupled to the column's respective BL and BLB, and a different separate WL. For example, column A includes bit cells 200-1, 200-4, and 200-7, wherein the bit cells 200-1, 200-4, and 200-7 are each coupled to the BL 202-1, BLB 203-1, CVDD 701-1, and WL's 206-1, 206-2, and 206-3, respectively; column B includes bit cells 200-2, 200-5, and 200-8, wherein the bit cells 200-2, 200-5, and 200-8 are each coupled to the BL 202-2, BLB 203-2, CVDD 701-2, and WL's 206-1, 206-2, and 206-3, respectively; and column C includes bit cells 200-3, 200-6, and 200-9, wherein the bit cells 200-3, 200-6, and 200-9 are each coupled to the BL 202-3, BLB 203-3, CVDD 701-3, and WL's 206-1, 206-2, and 206-3, respectively.

As described above, each bit cell 710 of the PUF cell array 700 (e.g., 710-1, 710-2, 710-3, 710-4, 710-5, 710-6, 710-7, 710-8, 710-9, etc.) may include a plurality of transistors (e.g., six MOSFET's for a 6T-SRAM bit cell, eight MOSFET's for an 8T-SRAM bit, three MOSFET's for an 3T-DRAM bit, etc.) to store a data bit. In some embodiments, a metastable state may be written to the bit cell by applying either a high state (i.e., a logical "1") or a low state (i.e., a logical "0") through a corresponding BL, BLB, and/or WL controlled by the PUF control circuit 114, which is discussed in further detail below.

Figure 7B:
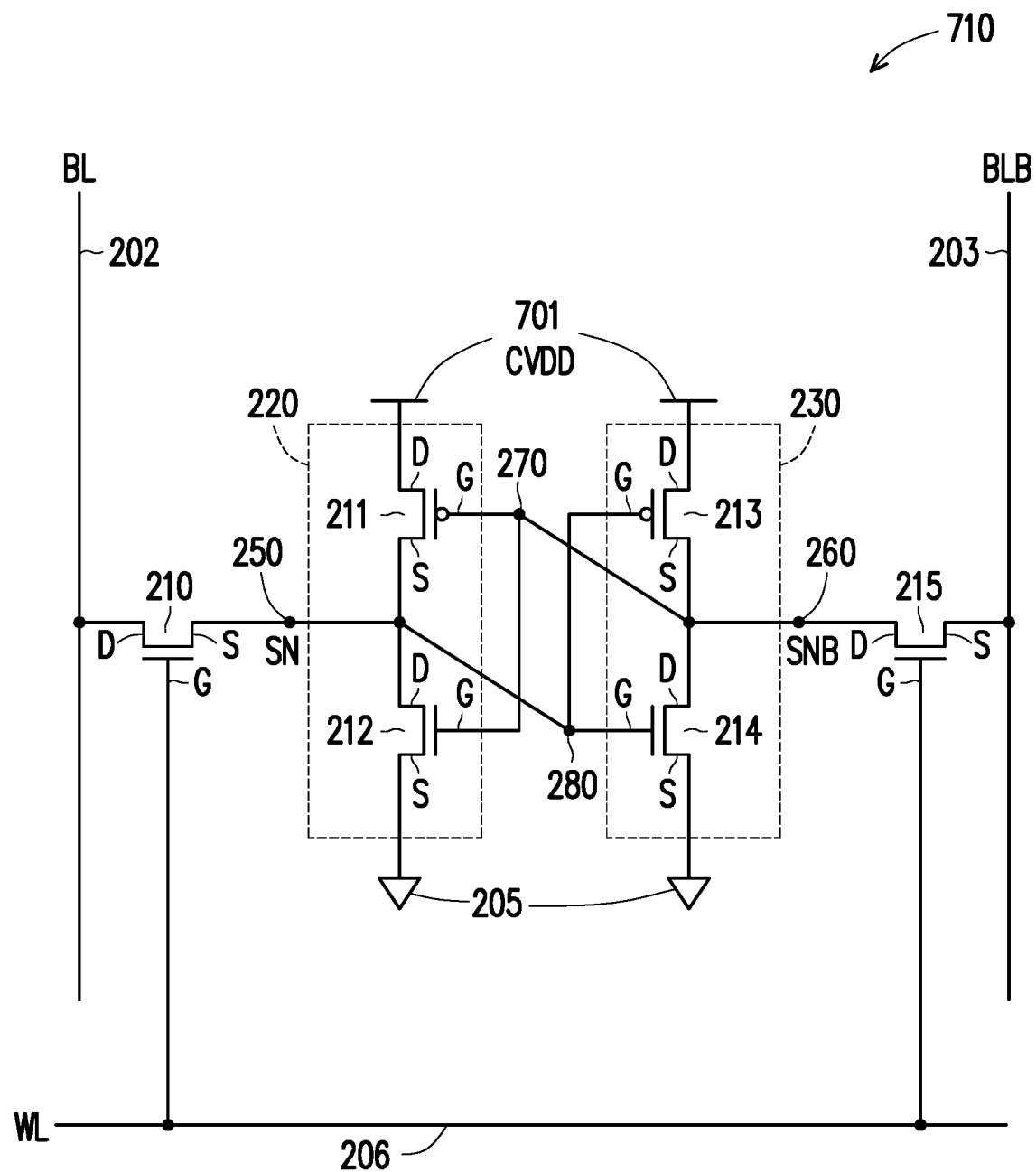
FIG. 7B illustrates an exemplary circuit diagram of a bit cell that is implemented as a 6T-SRAM bit cell, in accordance with various embodiments of the present disclosure.

FIG. 7B illustrates an exemplary circuit diagram of a bit cell 710 that is implemented as a 6T-SRAM bit cell, in accordance with various embodiments of the present disclosure. As shown, the bit cell 710 includes transistors: M1 210, M2 211, M3 212, M4 213, M5 214, and M6 215. Since all the bit cells 710 of the PUF cell array 700 are substantially similar in design to one another, for clarity, the following discussions of configurations and operations of the transistors of the bit cells will be generally directed to the bit cell 710.

In some embodiments, the transistors M2 211 and M3 212 are formed as a first inverter 220 on the left, and the transistors M4 213 and M5 214 are formed as a second inverter 230 on the right, wherein the first and second inverters 220/230 are coupled to each other in a back-to-back fashion. More specifically, source terminal of the transistor M2 211 is coupled with drain terminal of the transistor M3 212 at storage node (SN) 250. Similarly, source terminal of the transistor M4 213 is coupled with drain terminal of the transistor M5 214 at storage node bar (SNB) 260. Terminals G of the transistor M2 211 and M3 212 are coupled together at node 270, while terminals G of the transistors M4 213 and M5 214 are coupled together at node 280. Nodes 270 and 280 are electrically connected to SNB 260 and SN 250, respectively. The first and second inverters 220/230 are each coupled between first voltage reference 701 through drain terminal of the transistor M2 211 and M4 213, and second voltage reference 205 through the source terminal of the transistor M3 212 and M5 214. Generally, the first voltage reference 701 is the supply voltage (i.e., VDD line) to the bit cell 710, and the second voltage reference 205 is typically referred to as the GND 205, e.g., "ground". In some embodiments, the VDD 701 is coupled to the CVDD, which is further controlled by the PUF control circuit 114 (FIG. 1). For example, the CVDD 701 may range from about 30% of VDD to about 130% of VDD, wherein VDD is a nominal voltage level applied to each of the bit cells 710 of the PUF cell array 700 when the PUF cell array 700 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215. In addition to being coupled to the inverters 220/230, the transistors M1 210 and M6 215 are both coupled to the WL 206 and each coupled to the BL 202 and BLB 203, respectively. The transistors M1 210 and M6 215 are typically referred to as access transistors of the bit cell 710. In some embodiments, the transistors M1 210, M3 212, M5 214, and M6 215 each includes an NMOS transistor, and M2 211 and M4 213 each includes a PMOS transistor. Although the illustrated embodiments of FIG. 7B shows that M1-M6 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

Figure 8:
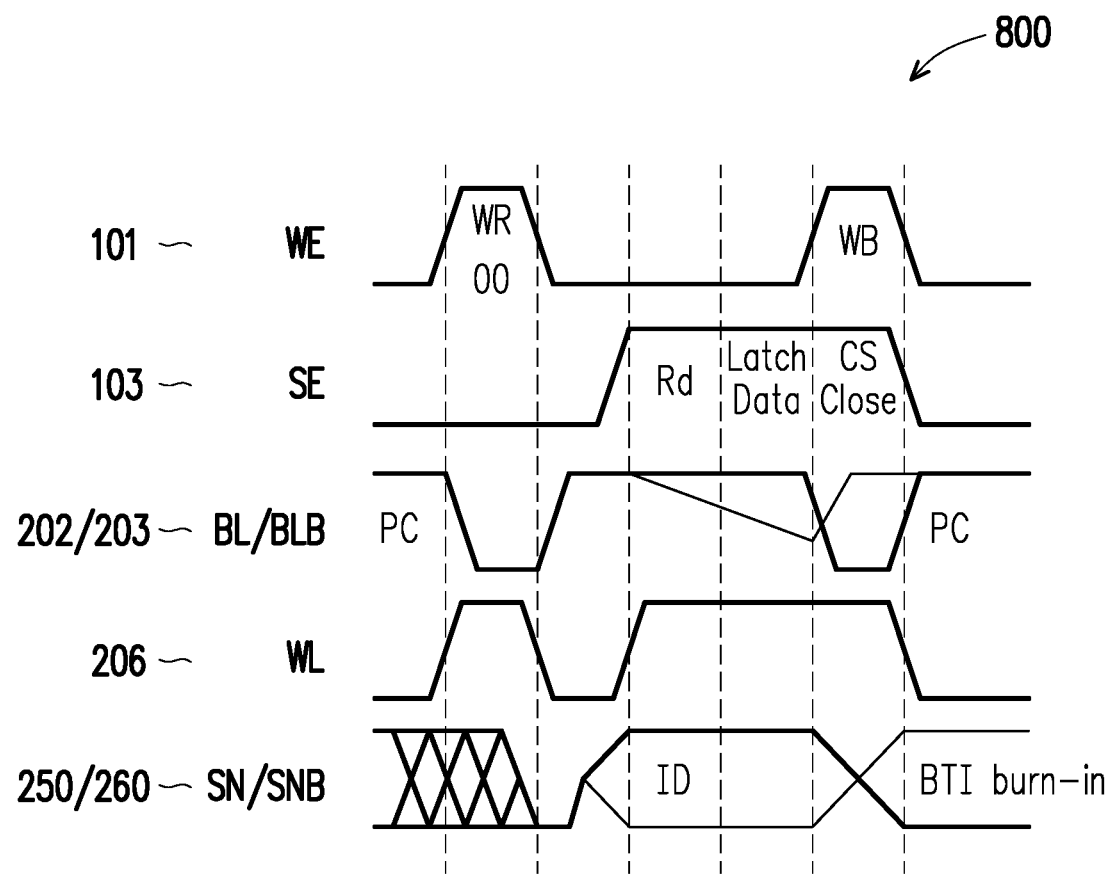
FIG. 8 illustrates waveforms of signals in a plurality of bit cells in at least one column of a PUF cell array to generate PUF signatures, in accordance with various embodiments of the present disclosure.

FIG. 8 illustrates waveforms of signals in bit cells 710 in at least one column of a PUF cell array 700 to generate PUF signatures, in accordance with various embodiments of the present disclosure. During operation, at least one column is selected and its SN 250 and SNB 260 are pre-charged to "0" by pulling down BL 202 and BLB 203 and pulling up WL 206. Most importantly, CVDD 701 is also pulled down so that a metastable state can be maintained on a cross-coupled inverters 220/230 when there is no supply voltage applied.

The WL 206 is then pulled down and the CVDD 701 is also pulled up so as to enable the cross-coupled inverters 220/230 by applying supply voltages, in which the SN 250 and SNB 260 are both previously pulled down to logical states "0". This metastable situation cannot be sustained once the cross-coupled inverters 220/230 are powered on due to the strength difference between the two inverters 220 and 230 which is caused by intrinsic process variations during fabrication. The small mismatch of strength in the cross-coupled inverters 220/230 will be eventually amplified by the positive feedback of the cross-coupled inverters 220/230 and will eventually generate either logic "1" or logic "0" as the logical state of the bit cell 710. Since the design is highly symmetric and the only randomness is caused by the fabrication process of the transistors in the cross-coupled inverters, the binary output of the logical states, when all bit cells 710 in the at least one column of the PUF cell array 700 are stabilized, are unique, random and non-traceable. Finally, the WL 206 is turned on to enable a readout of the SN 250 and SNB 260 to the BL 202 and BLB 203.

Figure 9:
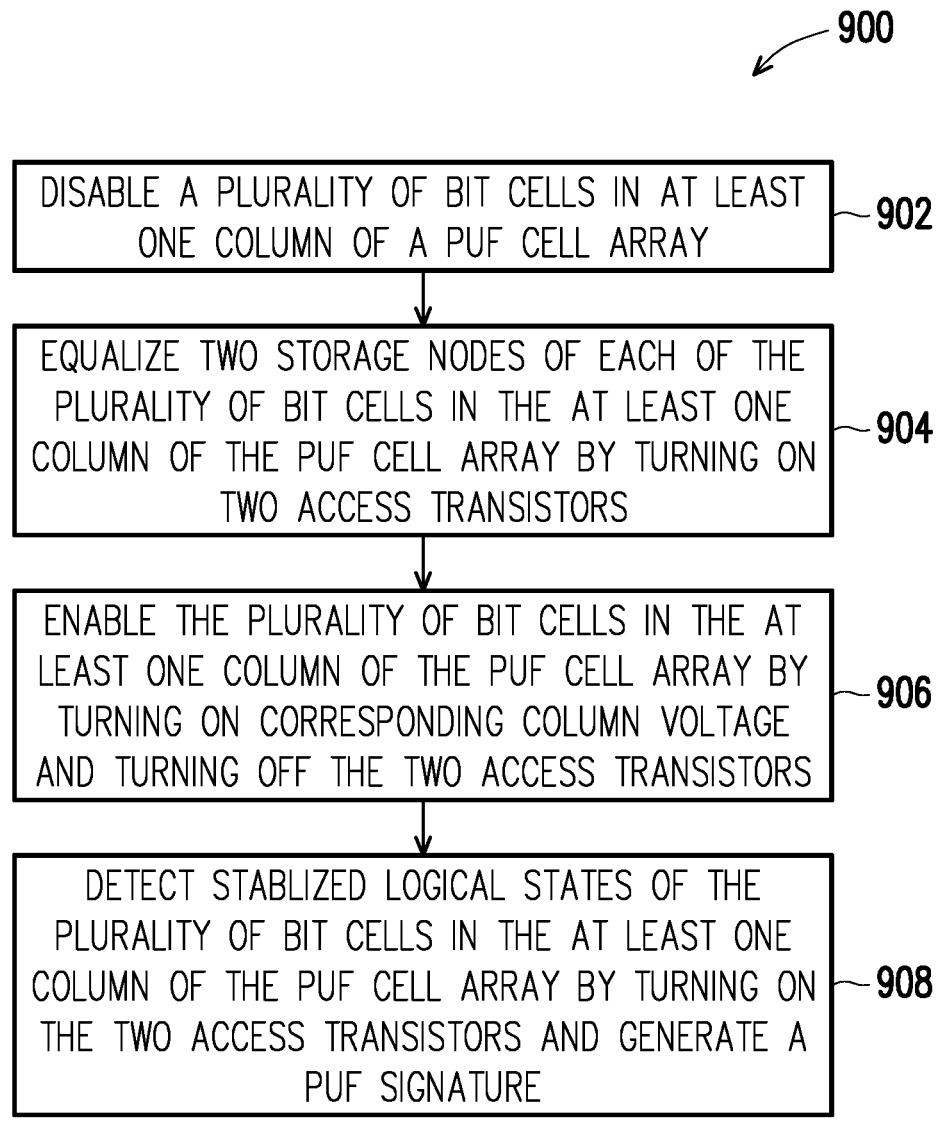
FIG. 9 illustrates a flow chart of a method to generate PUF signatures based on a PUF cell array comprising a plurality of bit cells, in accordance with various embodiments of present disclosure.

FIG. 9 illustrates a flow chart of a method 900 to generate PUF signatures based on a PUF cell array 700, in accordance with various embodiments of present disclosure. In various embodiments, the operations of method 900 are performed by the respective components illustrated in FIGS. 1 and 7A-B. For purposes of discussion, the following embodiment of the method 900 will be described in conjunction with FIGS. 1 and 7A-B. The illustrated embodiment of the method 900 is merely an example. Therefore, it should be understood that any of a variety of operations may be omitted, re-sequenced, and/or added while remaining within the scope of the present disclosure.

The method 900 starts with operation 902 in which at least one column in a PUF cell array 700 is first disabled, in accordance with various embodiments. In an example, referring again to FIGS. 1 and 7A, in response to a challenge (i.e., column address) received from the PUF control circuit 114 to power down all the bit cells 710 in the at least one column of the PUF cell array 700 by pulling down the corresponding CVDD 701 to GND.

The method 900 continues with operation 904 in which two storage nodes of each of the plurality of bit cells in the at least one column of the PUF cell array 700 is equalized so as to write metastable logical states, in accordance with various embodiments. Referring to FIGS. 1 and 7A, the PUF control circuit 114 writes a metastable state to each of the bit cells 710 in the at least one column by pulling down the corresponding BL 202 and BLB 203 to GND. The PUF control circuit 114 also provides a WL voltage to each bit cell 710 of the at least one column of the PUF cell array 700. A logical state "0" at both SN 250 and SNB 260 of each bit cell 710 in the at least one column of the PUF cell array 700 is thus configured, representing a metastable state for the bit cells 710 in the at least one column of the PUF cell array 700. In some embodiments, this operation is known as the "equalization" process.

The method 900 continues with operation 906 in which the plurality of bit cells 710 in the at least one column of the PUF cell array 700 are enabled by turning off the two access transistors 210/215 and turning on corresponding column voltage 701, in accordance with various embodiments. Continuing with the above example, the PUF control circuit 114 reads the logical state of each bit cell 710 of the at least one column by activating the WL 206. Referring to FIGS. 1 and 7A, each cross-coupled inverters 220/230 are intrinsically different due to the variations in manufacturing processes and small differences in the cross-coupled inverters are amplified after turning on the corresponding column voltage 701 and by the positive feedback of the cross-coupled inverters. Depending on the initial difference and the strength of the inverters, logic "1"s or "0"s are generated from each of the bit cells.

The method 900 continues with operation 908 in which a PUF signature is generated, in accordance with various embodiments. To read the stabilized logical states of each of the bit cells in the PUF cell array, the PUF control circuit 114 pulls up the WL voltage 206 so as to enable the access transistors 210/215. The PUF control circuit 114 further uses the logical states of the bit cells 710 in the at least one column of the PUF cell array 700 to generate a PUF signature. As mentioned above, a PUF signature, generated based on one or more intrinsic randomness of a plurality of bit cells in at least one column of a PUF cell array, is unique to the PUF cell array. In some embodiments, this operation is known as the "stabilization" process.

In some embodiments, before operation 908, operations 902, 904 and 906 can be repeated to obtain a histogram (i.e., a frequency plot) of a logical state of each bit cell 710 within the at least one column of the PUF cell array 700. The histogram is used as an accurate representation of the distribution of logical states of bit cells within a plurality of equalization/stabilization cycles. In some embodiments, if over 70% of logical states collected from the plurality of equalization/stabilization cycles from a bit cell is either 1 or 0, then the bit cell is considered to be stable and the statistically dominant logical state is used as the logical state of the bit cell. In some embodiments, if equal or less than 70% of logical states collected from the plurality of equalization/stabilization cycles from a bit cell is either 1 or 0, then the bit cell is considered to be unstable and will be abandoned or excluded from being used as part of the PUF signature.

Figure 10A:
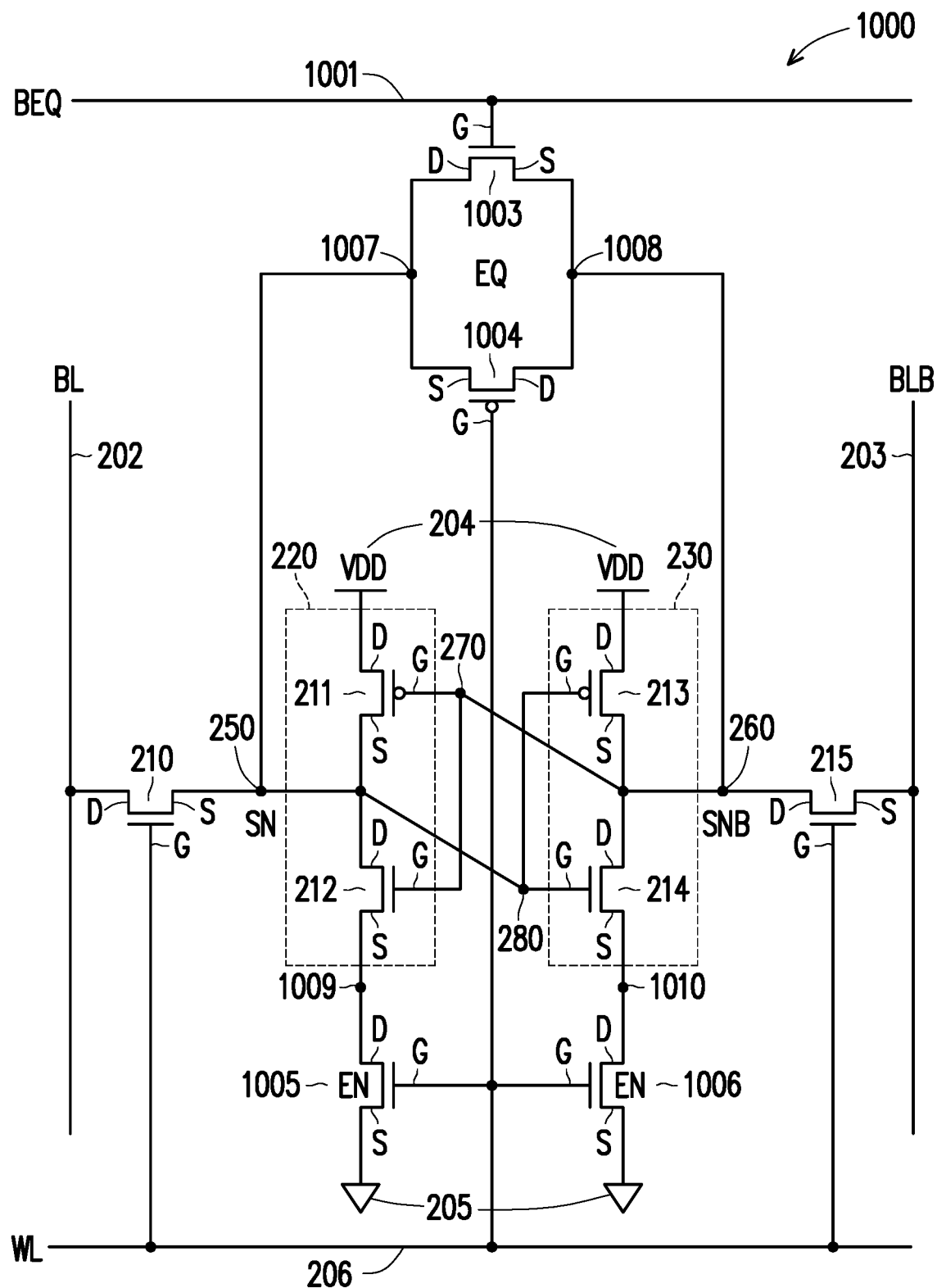
FIG. 10A illustrates an exemplary circuit diagram of a bit cell that is implemented as a SRAM bit cell with in-bitcell equalizer (EQ) and enable (EN) transistors, in accordance with various embodiments of the present disclosure.

FIG. 10A illustrates an exemplary circuit diagram of a bit cell 1000 that is implemented as a SRAM bit cell with in-bitcell equalizer (EQ) and enable (EN) transistors, in accordance with various embodiments of the present disclosure. Similar to SRAM bit cells shown in FIGS. 2B, 5B and 7B, the bit cell 1000 includes transistors: M1 210, M2 211, M3 212, M4 213, M5 214, and M6 215. The bit cell 1000 further comprises M7 1003, M8 1004, M9 1005, and M10 1006. In some embodiments, M7 1003 and M8 1004 are EQ transistors, and M9 1005 and M10 1006 are EN transistors, which are also known as "in-bitcell footer".

In some embodiments, the transistor M2 211 and M3 212 are formed as a first inverter 220 on the left and the transistors M4 213 and M5 214 are formed as a second inverter 230 on the right wherein the first and second inverters 220/230 are coupled to each other. More specifically, source terminal of the transistor M2 211 is coupled with drain terminal of the transistor M3 212 at storage node (SN) 250. Similarly, source terminal of the transistor M4 213 is coupled with drain terminal of the transistor M5 214 at storage node bar (SNB) 260. Gate terminals of the transistor M2 211 and M3 212 are coupled together at node 270, while gate terminals of the transistors M4 213 and M5 214 are coupled together at node 280. The first and second inverters 220/230 are each coupled between first voltage reference 204 through drain terminal of the transistor M2 211 and M4 213, and second voltage reference 205 through the source terminal of the transistor M3 212 and M5 214. Generally, the first voltage reference 204 is the supply voltage to the bit cell 1000. In some embodiments, the first voltage reference 204 is typically referred to as a "VDD". The second voltage reference 205 is typically referred to as the GND 205, e.g., "ground". In some embodiments, the VDD 204 is coupled to the inverters 220 and 230 at drain terminals of transistors M3 212 and M5 214, respectively, which is further controlled by the PUF control circuit 114 (FIG. 1). Specifically, drain and source terminals of transistor M7 1003 are coupled to source and drain terminals of transistor M8 1004 at nodes 1007 and 1008, respectively. In the illustrated embodiments, diodes 1007 and 1008 are coupled to SN 250 and SNB 260, respectively. Gate terminals of transistors M7 1003 and M8 1004 are coupled to bit equalizer line (BEQ) 1001 and word line (WL) 206. For example, the VDD 204 may range from about 30% of VDD to about 130% of VDD, wherein VDD is a nominal voltage level applied to each of the bit cells 1000 of the PUF cell array 200 when the PUF cell array 200 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215. In addition to being coupled to the inverters 220/230, gate terminals of the transistors M1 210 and M6 215 are both coupled to the WL 206. Source and drain terminals of the transistors M1 210 and M6 215 are coupled to the BL 202 and BLB 203, respectively. The transistors M1 210 and M6 215 are typically referred to as access transistors of the bit cell 1000. Drain terminals of M9 1005 and M10 1006 are coupled to source terminals of the transistors M3 and M5 at node 1009 and 1010, respectively. In some embodiments, nodes 1009 and 1010 can be coupled together. Source terminals of the transistors M9 1005 and M10 1006 are coupled to GND. Gate terminals of the transistors M9 1005 and M10 1006 are coupled together to the WL 206. In some embodiments, the transistors M1 210, M3 212, M5 214, M6 215, M7 1003, M9 1005, and M10 1006 each includes an NMOS transistor, and the transistors M2 211, M4 213, and M8 1004 each includes a PMOS transistor. Although the illustrated embodiments of FIG. 10 shows that M1-M10 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

Figure 10B:
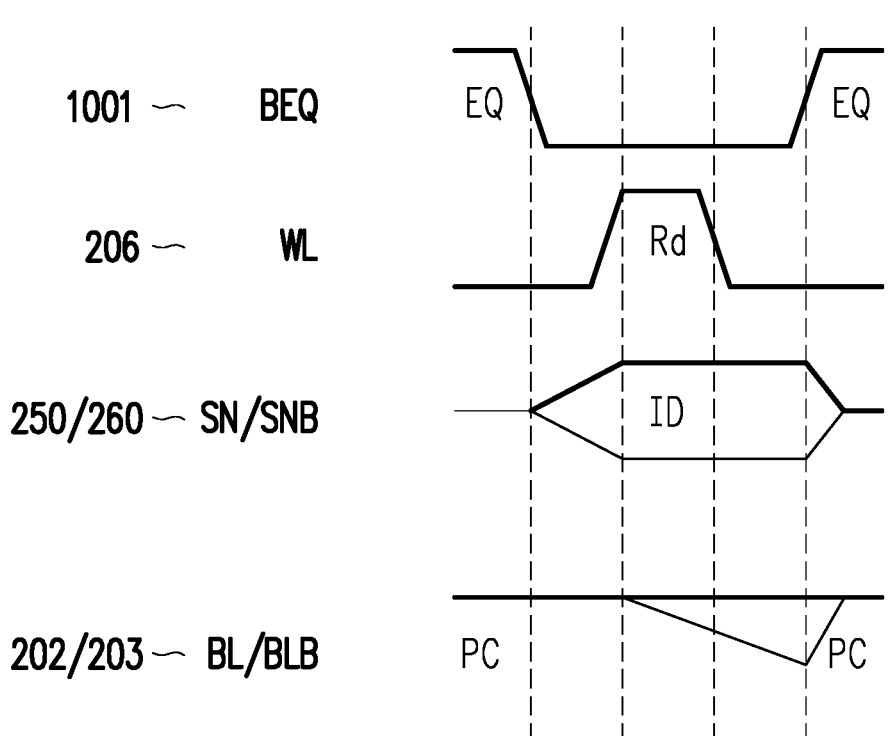
FIG. 10B illustrates waveforms of signals in bit cells of a PUF cell array to generate PUF signatures, in accordance with various embodiments of the present disclosure.

FIG. 10B illustrates waveforms of signals in a bit cell 1000 of a PUF cell array 200 to generate PUF signatures, in accordance with various embodiments of the present disclosure. During operation, when the WL 206 is pulled down and the BEQ 1001 is pulled up, the transistors M1 210 and M6 215 are turned off, and the transistor M7 1003 and M8 1004 are turned on which allow a discharge of the SN 250 and SNB 260 to a value that are substantially equal. In some embodiment, when the BEQ 1001 is pulled up to VDD and the WL 206 is pulled down to GND, the EQ transistors 1003/1004 pull their source and drain terminals 1007 and 1008 to VDD/2, which further pull up the SN and SNB nodes 250/260 to VDD/2.

When the BEQ 1001 is pulled down and the WL 206 is pulled up, the EQ transistors M7 1003 and M8 1004 are turned off and the EN transistors M7 1302 and M8 1303 are turned on thus enabling supply power to be applied on the cross-coupled inverters 220/230. A metastable state, where the SN 250 and SNB 260 are pulled to an equal value, e.g., VDD/2, cannot be sustained once the cross-coupled inverters 220/230 are powered on due to the strength difference between the two cross-coupled inverters 220 and 230 which is caused by intrinsic process variations during fabrication. The small mismatch of strength in the cross-coupled inverters 220/230 will be eventually amplified by the positive feedback of the cross-coupled inverters 220/230 and will eventually generate either logic "1" or logic "0". Since the design is highly symmetric and the randomness can be only caused by the fabrication process of the transistors in the cross-coupled inverters, the binary output of the logical states when all bit cells 1000 are stabilized once being turned on are unique, random and non-traceable. Besides the intrinsic mismatch between the strength of the inverters, the intrinsic tendency of a bit cell 1000 to generate either logic "1" or logic "0" can be also contributed to by the EQ transistors 1007 and 1008 and the EN transistors M9 1005 and M10 1006, which result in a small mismatch in initial voltage levels on the SN and SNB 250/260 and/or on nodes 1009 and 1010. Finally, the WL 206 is turned on to enable a readout of the SN 250 and SNB 260 to the BL 202 and BLB 203, respectively.

Figure 11A:
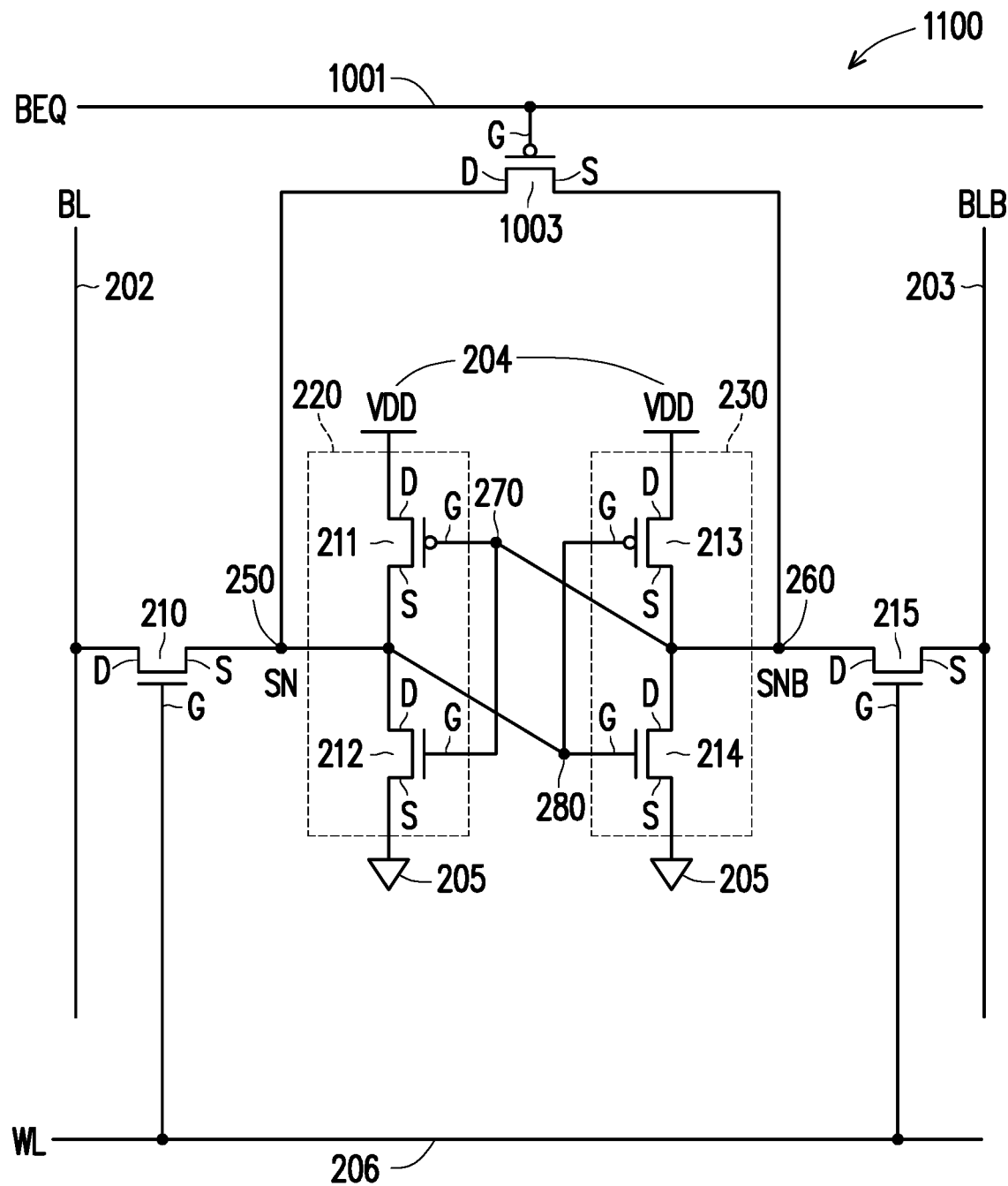
FIG. 11A illustrates an exemplary circuit diagram of a bit cell that is implemented as a SRAM bit cell with an in-bitcell equalizer (EQ) transistor, in accordance with various embodiments of the present disclosure.

FIG. 11A illustrates an exemplary circuit diagram of a bit cell 1000 that is implemented as a SRAM bit cell with an in-bitcell equalizer (EQ) transistor, in accordance with various embodiments of the present disclosure. Similar to SRAM bit cells shown in FIGS. 2B, 5B and 7B, the bit cell 1100 includes transistors: M1 210, M2 211, M3 212, M4 213, M5 214, and M6 215. In some embodiments, M7 1003 is an EQ transistor, which are also known as "in-bitcell footer".

In some embodiments, the transistor M2 211 and M3 212 are formed as a first inverter 220 on the left and the transistors M4 213 and M5 214 are formed as a second inverter 230 on the right wherein the first and second inverters 220/230 are coupled to each other. More specifically, source terminal of the transistor M2 211 is coupled with drain terminal of the transistor M3 212 at storage node (SN) 250. Similarly, source terminal of the transistor M4 213 is coupled with drain terminal of the transistor M5 214 at storage node bar (SNB) 260. Gate terminals of the transistor M2 211 and M3 212 are coupled together at node 270, while gate terminals of the transistors M4 213 and M5 214 are coupled together at node 280. The first and second inverters 220/230 are each coupled between first voltage reference 204 through drain terminal of the transistor M2 211 and M4 213, and second voltage reference 205 through the source terminal of the transistor M3 212 and M5 214. Generally, the first voltage reference 204 is the supply voltage to the bit cell 1000. In some embodiments, the first voltage reference 204 is typically referred to as a "VDD". The second voltage reference 205 is typically referred to as the GND 205, e.g., "ground". In some embodiments, the VDD 204 is coupled to the inverters 220 and 230 at drain terminals of transistors M3 212 and M5 214, respectively, which is further controlled by the PUF control circuit 114 (FIG. 1). Specifically, drain and source terminals of transistor M7 1003 are coupled to coupled to SN 250 and SNB 260, respectively. Gate terminal of the transistor M7 1003 is coupled to bit equalizer line (BEQ) 1001. For example, the VDD 204 may range from about 30% of VDD to about 130% of VDD, wherein VDD is a nominal voltage level applied to each of the bit cells 1000 of the PUF cell array 200 when the PUF cell array 200 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215. In addition to being coupled to the inverters 220/230, gate terminals of the transistors M1 210 and M6 215 are both coupled to the WL 206. Source and drain terminals of the transistors M1 210 and M6 215 are coupled to the BL 202 and BLB 203, respectively. The transistors M1 210 and M6 215 are typically referred to as access transistors of the bit cell 1000. In some embodiments, the transistors M1 210, M3 212, M5 214, and M6 215, each includes an NMOS transistor, and the transistors M2 211, M4 213, and M7 1003 each includes a PMOS transistor. Although the illustrated embodiments of FIG. 10 shows that M1-M7 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

Figure 11B:
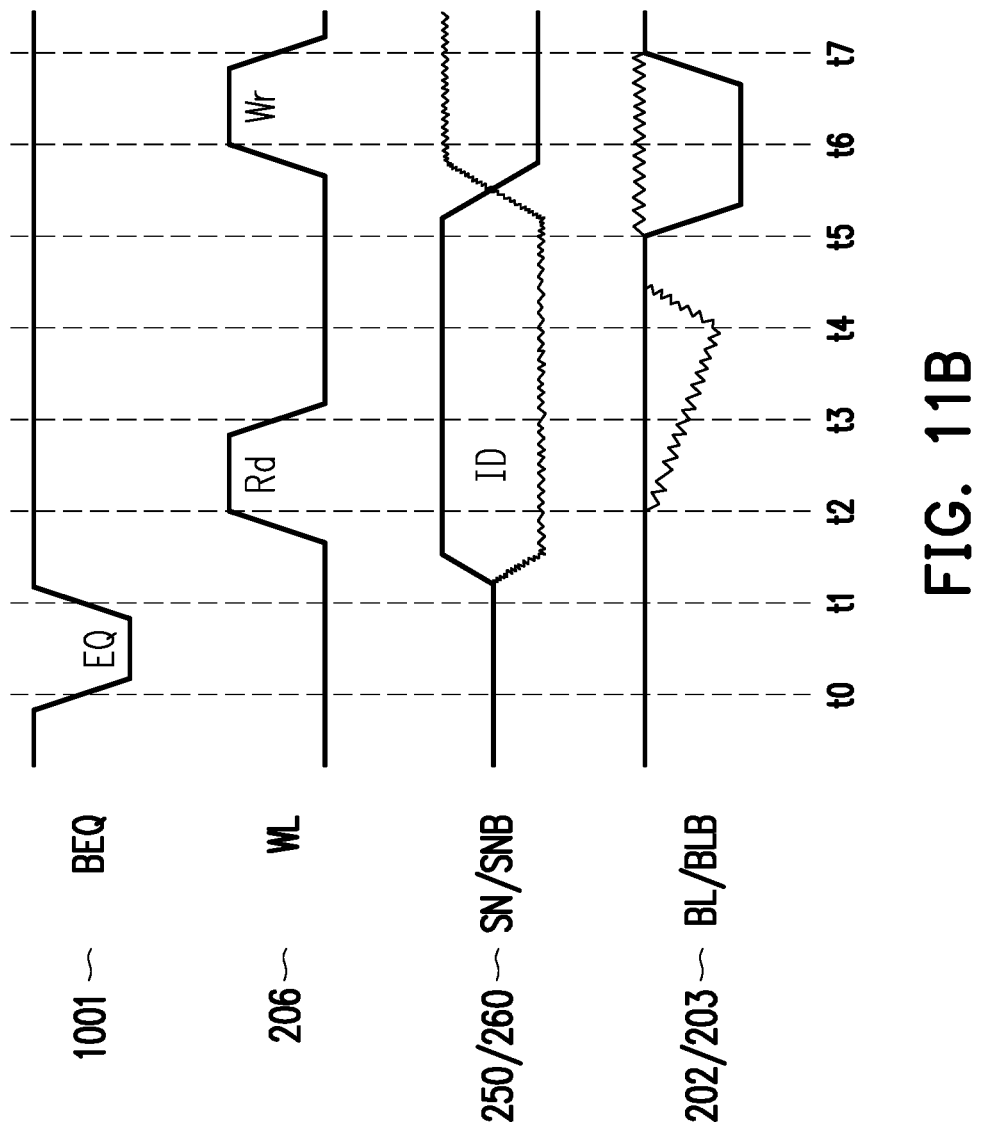
FIG. 11B illustrates waveforms of signals in bit cells of a PUF cell array to generate PUF signatures, in accordance with various embodiments of the present disclosure.

FIG. 11B illustrates waveforms of signals in a bit cell 1100 of a PUF cell array 200 to generate PUF signatures, in accordance with various embodiments of the present disclosure. During operation, the power to the plurality of bit cells are on. When the WL 206 is pulled down and the BEQ 1001 is pulled down at t0, the transistors M1 210 and M6 215 are turned off, and the transistor M7 1003 is turned on which allow a discharge of the SN 250 and SNB 260 to a value that are substantially equal. In some embodiment, when the BEQ 1001 is pulled down to GND and the WL 206 is pulled down to GND, the EQ transistor 1003 pulls its source and drain terminals to VDD/2, which further pull up the SN and SNB nodes 250/260 to VDD/2.

When the BEQ 1001 is pulled up at t1, the EQ transistor M7 1003 is turned off and A metastable state, where the SN 250 and SNB 260 are pulled to an equal value, e.g., VDD/2, cannot be sustained on the cross-coupled inverters 220/230 due to the strength difference between the two cross-coupled inverters 220 and 230 which is caused by intrinsic process variations during fabrication. The small mismatch of strength in the cross-coupled inverters 220/230 will be eventually amplified by the positive feedback of the cross-coupled inverters 220/230 and will eventually generate either logic "1" or logic "0". The randomness can be only caused by the fabrication process of the transistors in the cross-coupled inverters, the binary output of the logical states when all bit cells 1100 are stabilized once being turned on are unique, random and non-traceable. Besides the intrinsic mismatch between the strength of the inverters, the intrinsic tendency of a bit cell 1100 to generate either logic "1" or logic "0" can be also contributed to by the EQ transistor 1007, which result in a small mismatch in initial voltage levels on the SN and SNB 250/260. Finally, the WL 206 is turned on at t2 to enable a readout of the SN 250 and SNB 260 to the BL 202 and BLB 203, respectively.

The WL 206 is pulled down at t3 to stop the readout of the SN/SNB 250/260 to the BL/BLB 202/203. Opposite data can be written to the bit by pulling up the WL 206 at t5 which turns on the access transistors 210/215 and pulling up the BL 202 and pulling down the BLB 203. The SN 250 and SNB 260 can then be written with 0 and 1.

Figure 12:
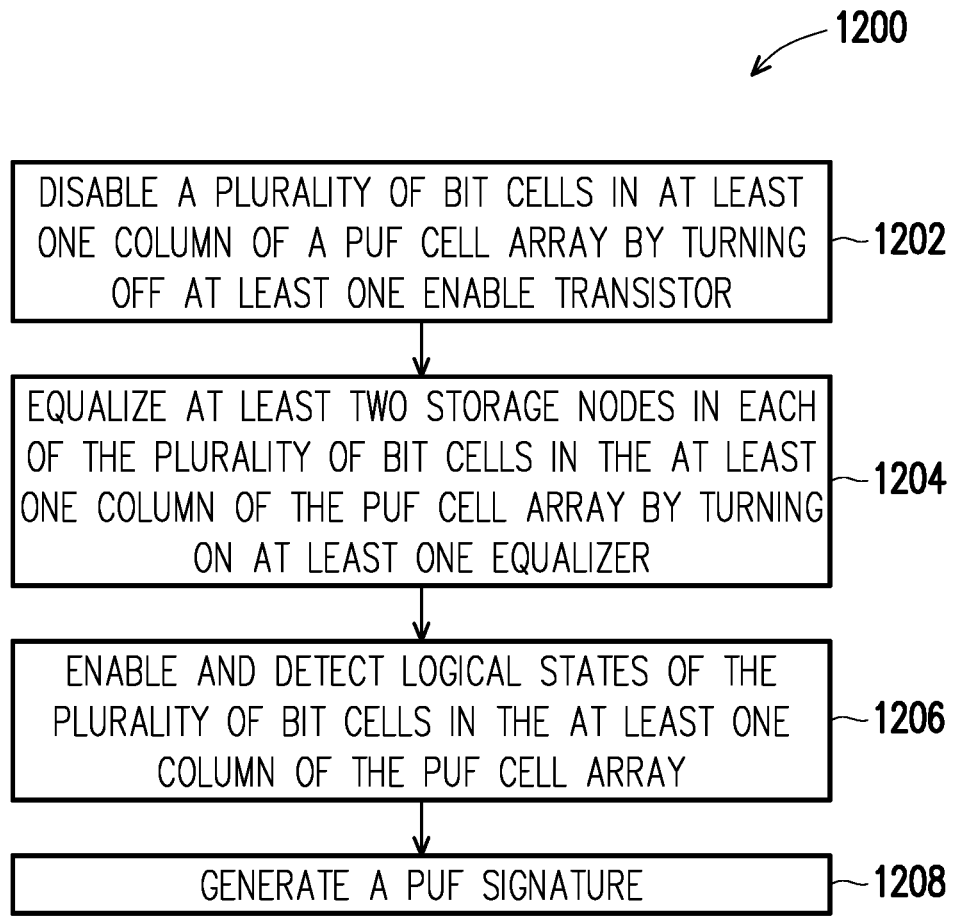
FIG. 12 illustrate a flow chart of a method to generate PUF signatures based on a PUF cell array comprising a plurality of bit cells, in accordance with various embodiments of present disclosure.

FIG. 12 illustrate a flow chart of a method 1200 to generate a PUF signature based on a PUF cell array 102 comprising SRAM-based bit cells 1000, in accordance with various embodiments of present disclosure. In various embodiments, the operations of method 1200 are performed by the respective components illustrated in FIGS. 1, 2A and 10. For purposes of discussion, the following embodiment of the method 1200 will be described in conjunction with FIGS. 1, 2A and 10. The illustrated embodiment of the method 1200 is merely an example. Therefore, it should be understood that any of a variety of operations may be omitted, re-sequenced, and/or added while remaining within the scope of the present disclosure.

The method 1200 starts with operation 1202 in which a plurality of bit cells 1000 in at least one column of a PUF cell array 102 are disabled by turning off at least one enable transistor, in accordance with various embodiments. In an example, referring to FIG. 10, in response to a challenge (row address) received, the PUF control circuit 114 pulls down a WL voltage so as to turn off the EN transistors M9 1005/M10 1006 in a plurality of bit cells 1000.

The method 1200 continues with operation 1204 in which at least two storage nodes SN 250 and SNB 260 of each of the plurality of bit cells in the at least one column of the PUF cell array are pre-discharged to a substantially equal value by turning on at least one equalizer, in accordance with various embodiments. Continuing with the example, referring to FIG. 10, the PUF control circuit 114 pre-charges both input storage nodes of a cross-coupled inverters 220/230, i.e., SN 250 and SNB 260, to "VDD/2" by pulling up the corresponding BEQ 1001 of a row in the PUF cell array 200, so as to turn on the EQ transistors M7 1003 and M8 1004 in each bit cell 1000 in the row. In some embodiments, the substantially equal values on the SN/SNB 250/260 of the cross-coupled inverters 220/230 generates a metastable state on the cross-coupled inverters 220/230. This is known as the equalization process. In some embodiments, the PUF control circuit 114 controls the row decoder to turn on each row of bit cells in the at least one column one by one.

The method 1200 continues to operation 1206 in which the plurality of bit cells 1000 are enabled to allow the logical states of the plurality of bit cells 1000 to stabilize from the metastable states and detected by the PUF control circuit 114, in accordance with various embodiments. Continuing with the above example, the BEQ 1001 and the WL 206 of the row is then pulled down and up, respectively, so as to turn off the EQ transistors M7 1003 and M8 1004 and turn on the EN transistors M9 1005 and M10 1006. In some embodiments, turning on the enable transistors M9 1005 and M10 1006 enables the cross-coupled inverters 220/230. Pulling-down on the WL 206 of the row also turns off the access transistors M1 210 and M6 215. Referring to FIG. 10, each cross-coupled inverters 220/230 in a bit cell 1000 are intrinsically different (e.g., strength of transistors) due to the variations in manufacturing processes and small differences in the cross-coupled inverters 220/230 are amplified by the positive feedback of the cross-coupled inverters 220/230 and eventually depending on the difference between the cross-coupled inverters 220/230, a logical state "1" or "0" is generated for the bit cell 1000. This small difference, in some embodiments, caused by a small difference in initial voltage levels on the SN 250 and SNB 260, and/or a small difference in the strength of the cross-coupled inverters 220/230, represents the unique asymmetry in the bit cell 1000 thus the unique PUF signature. In some embodiments, the PUF control circuit 114 reads the logical states of the plurality of bit cells 1000 in the at least one column of the PUF cell array by pulling up the corresponding WL 206 one by one.

The method 1200 continues with operation 1208 in which a PUF signature is generated, in accordance with various embodiments. The PUF control circuit 114 uses the logical states of the plurality of bit cells 1000 in the at least one column to generate a PUF signature. As mentioned above, a PUF signature, generated based on one or more intrinsic randomness of a plurality of bit cells 1000 in the at least one column of the PUF cell array 102, is unique to the PUF cell array 102.

In some embodiments, before operation 1208, operations 1202, 1204 and 1206 can be repeated to obtain a histogram (i.e., a frequency plot) of logical states of each bit cell 1000 in a selected row of a PUF cell array 200. The histogram is used as an accurate representation of the distribution of logical states of bit cells 1000 within a plurality of challenge-response cycles. In some embodiments, if over and equal to 70% of logical states collected from a bit cell 1000 over the plurality of challenge-response cycles is either "1" or "0", then the bit cell 1000 is considered to be stable and the logical state that is statistically dominant in the histogram is used as the logical state of the bit cell 1000. In some embodiments, if there are less than 70% of logical states collected from a bit cell 1000 over the plurality of challenge-response cycles is either "1" or "0", then the bit cell is considered to be unstable and will be abandoned or excluded from being used as part of the PUF signature.

Figure 13A:
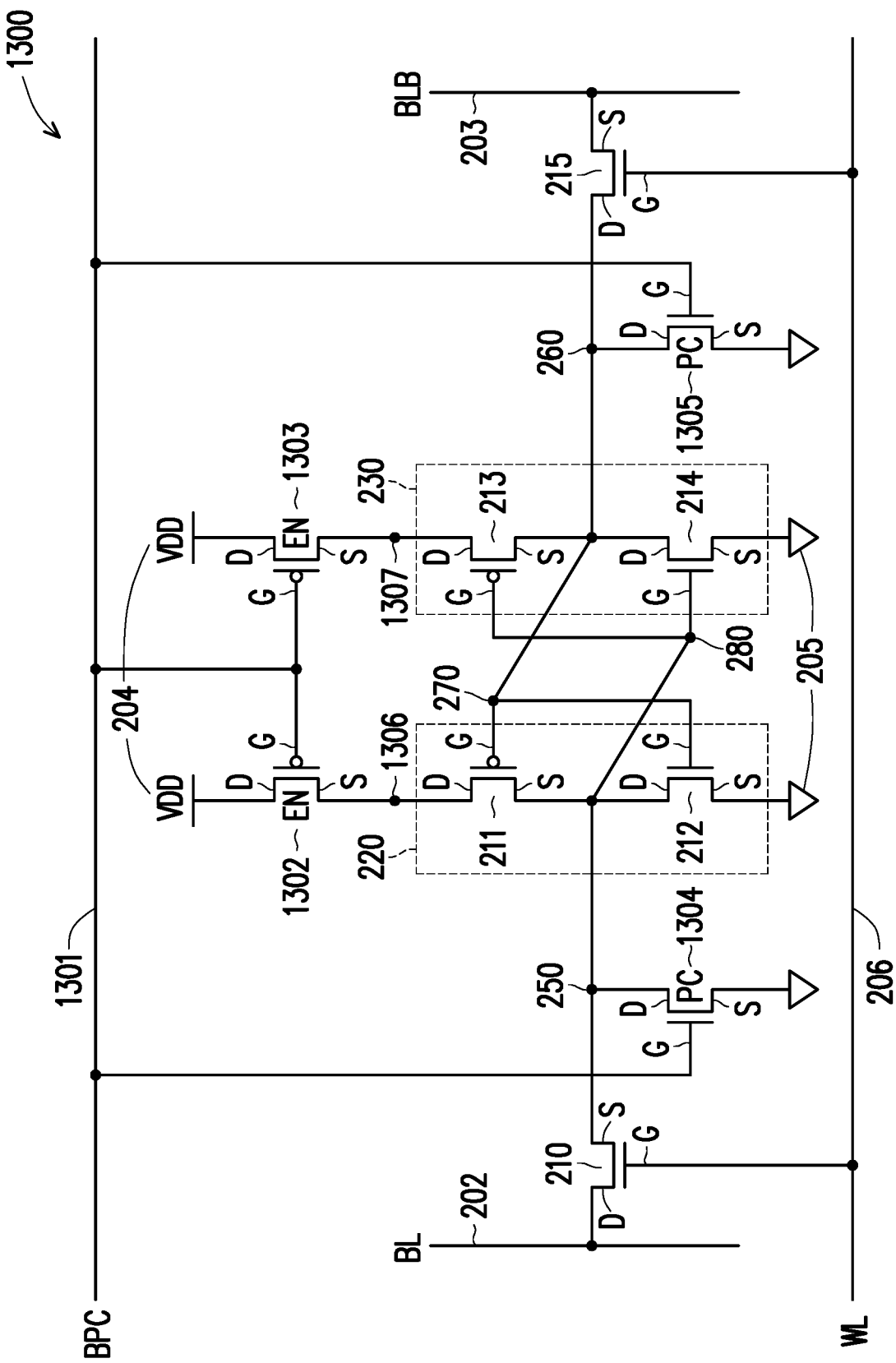
FIG. 13A illustrates an exemplary circuit diagram of a bit cell that is implemented as a SRAM bit cell with in-bitcell pre-charge (PC) and enable (EN) transistors, in accordance with various embodiments of the present disclosure.

FIG. 13A illustrates an exemplary circuit diagram of a bit cell 1300 that is implemented as a bit cell with in-bitcell pre-charge (PC) and enable (EN) transistors, in accordance with some embodiments of the present disclosure. The bit cell 200 includes transistors: M1 210, M2 211, M3 212, M4 213, M5 214, M6 215, M7 1302, M8 1303, M9 1304, and M10 1305. In some embodiments, the transistors M7 and M8 are EN transistors and the transistors M9 and M10 are PC transistors.

In some embodiments, the transistors M2 211 and M3 212 are formed as a first inverter 220 on the left and the transistors M4 213 and M5 214 are formed as a second inverter 230 on the right wherein the first and second inverters 220/230 are cross-coupled to each other. More specifically, source terminal of the transistor M2 211 is coupled with drain terminal of the transistor M3 212 at a storage node (SN) 250. Similarly, source terminal of the transistor M4 213 is coupled with drain terminal of the transistor M5 214 at a storage node bar (SNB) 260. Gate terminals of the transistors M2 211 and M3 212 are coupled together at node 270, while gate terminals of the transistors M4 213 and M5 214 are coupled together at node 280. The first and second inverters 220/230 are each coupled between first voltage reference 204 through drain terminals of the transistor M2 211 and M4 213, and second voltage reference 205 through the source terminals of the transistor M3 212 and M4 214. Generally, the first voltage reference is the supply voltage to the bit cell 200. In some embodiments, the first voltage reference 204 is typically referred to as a "VDD". The second voltage reference 205 is typically referred to as the GND 205, e.g., "ground". In some embodiments, the VDD 204 is coupled to the cross-coupled inverters 220 and 230 through the EN transistors M7 and M8, respectively, which are further controlled by the voltage control circuit 120 of the authentication circuit 104 (FIG. 1). Specifically, source terminals of the EN transistors M7 1302 and M8 1303 are coupled to drain terminals of the transistors M2 211 and M4 213 at the nodes 1306 and 1307. Drain terminals of the EN transistors M7 1302 and M8 1303 are coupled to the VDD 204, e.g., VDD. Gate terminals of the transistors M7 1302 and M8 1303 are coupled to each other and further electrically connected to a bit pre-charge line (BPC) 1301. For example, the VDD 204 is applied to each of the bit cells 200 of the PUF cell array 1 when the PUF cell array 200 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215. In addition to being coupled to the cross-coupled inverters 220/230, gate terminals of the transistors M1 210 and M6 215 are both coupled to the WL 206. Drain terminal of the transistor M1 210 and source terminal of the transistor M6 215 each coupled to the BL 202 and BLB 203, respectively. The transistors M1 210 and M6 215 are typically referred to as access transistors of the bit cell 200. Source terminals of the transistors M9 1304 and M10 1305 are coupled to the node SN 250 and SNB 260, respectively. Drain terminals of the transistors M9 1304 and M10 1305 are coupled to GND. Gate terminals of the transistors M9 1304 and M10 1305 are both coupled to the BPC 1301. In some embodiments, the transistors M1 210, M3 212, M5 214, M6 215, M9 1304, and M10 1305 each includes an NMOS transistor, and the transistors M2 211, M4 213, M7 1302 and M8 1303 each includes a PMOS transistor. In some other embodiments, the transistors M1 210, M3 212, M5 214, M6 215, M9 1304, and M10 1305 each includes a PMOS transistor, and the transistors M2 211, M4 213, M7 1302 and M8 1303 each includes an NMOS transistor, when the VDD 204 and the GND 205 are switched. Although the illustrated embodiments of FIG. 2B shows that M1-M10 are either NMOS or PMOS transistors, any of a variety of transistors or devices that are suitable for use in a memory device may be implemented as at least one of M1-M10 such as, for example, a bipolar junction transistor (BJT), a high-electron mobility transistor (HEMT), etc.

Figure 13B:
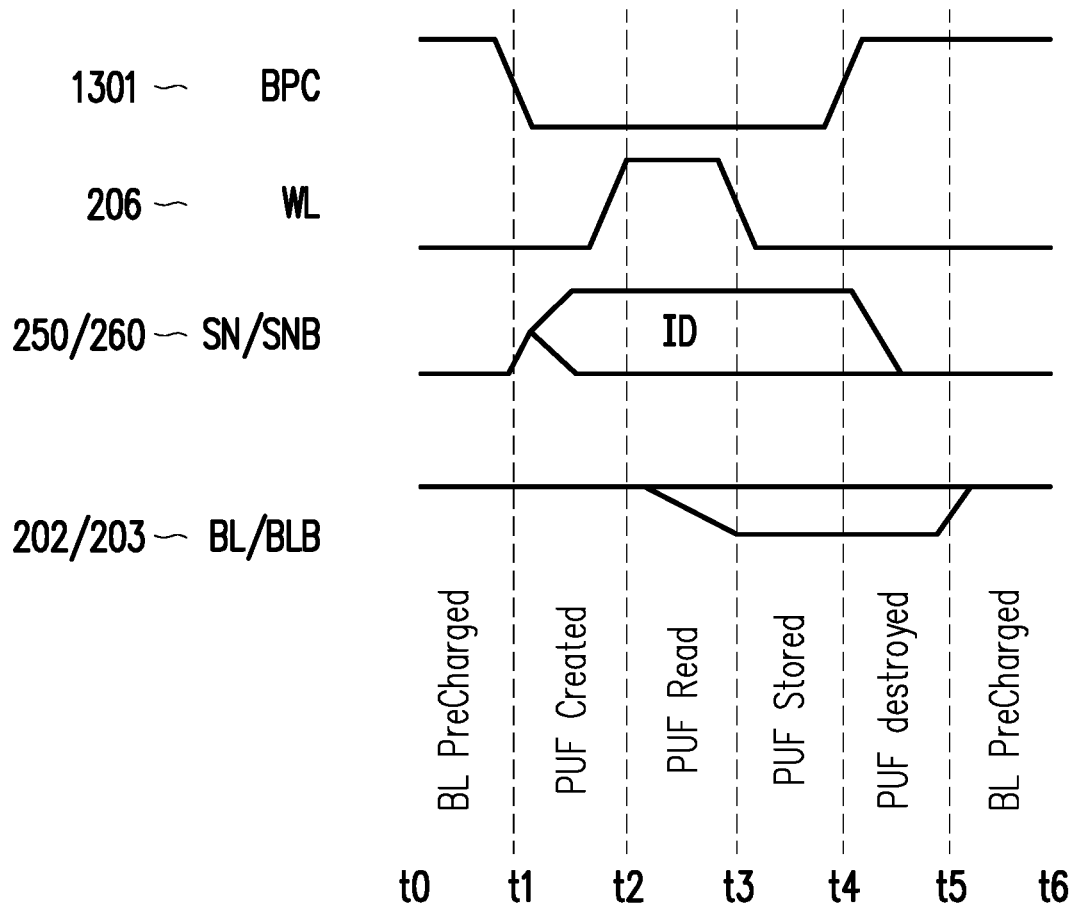
FIG. 13B illustrates waveforms of signals in bit cells of a PUF cell array to generate PUF signatures, in accordance with various embodiments of the present disclosure.

FIG. 13B illustrates waveforms of signals in bit cells 1300 of a PUF cell array to generate PUF signatures, in accordance with various embodiments of the present disclosure. During operation between time t0 and t1, when the WL 206 is pulled down and the BPC 1301 is pulled up, the transistors M1 210 and M6 215 are turned off, and the pre-charge transistors M9 1304 and M10 1305 are turned on which allow a discharge of the SN 250 and SNB 260 to GND. Meanwhile, when the BPC 1301 is pulled up, the enable transistors M7 1302 and M8 1303 are turned off In some embodiments, when the SN 250 and SNB 260 are pulled down to GND by turning on the pre-charge transistors M9 1304 and M10 1305, the two cross-coupled inverters 220/230 that are directly coupled to VDD without the EN transistors M7 1302 and M8 1303. In some embodiments, the pre-charge transistors M7 1302 and M8 1303 are configured to allow "0"s stored on the SN 250 and SNB 260 and to minimize crowbar current by powering down the cross-coupled inverters 220/230.

When the BPC 1301 is pulled down, the pre-charge transistors M9 1304 and M10 1305 are turned off and the EN transistors M7 1302 and M8 1303 are turned on thus providing supply power to the cross-coupled inverters 220/230, where the SN 250 and SNB 260 are both previous pulled down to logical states "0". This metastable state cannot be sustained once the cross-coupled inverters 220/230 are powered on due to the strength difference between the two cross-coupled inverters 220 and 230 caused by intrinsic process variations during fabrication. The small mismatch of strength in the cross-coupled inverters 220/230 will be eventually amplified by the positive feedback of the cross-coupled inverters 220/230 and will eventually generate either logic "1" or logic "0". Since the design is highly symmetric and the only randomness is caused by the fabrication process of the transistors in the cross-coupled inverters, the binary output of the logical states, when the plurality of bit cells 200 are stabilized after being powered up, are unique, random and non-traceable.

The WL 206 is pulled up at time t2 to enable a readout of the SN 250 and SNB 260 to the BL 202 and BLB 203, respectively. The WL 206 is then pulled down at time t3 while the BPC 1301 is kept low, the PUF is stored at the storage nodes 250/260 until the BPC 1301 is pulled up at time t4 which turns on the two pre-charge transistors M9 1304/M10 1305 and turns off the two enable transistors M7 1302/M8 1303 to wipe out previous logical states stored at the two storage nodes by discharge the two storage nodes 250/260 to GND.

Figure 14A:
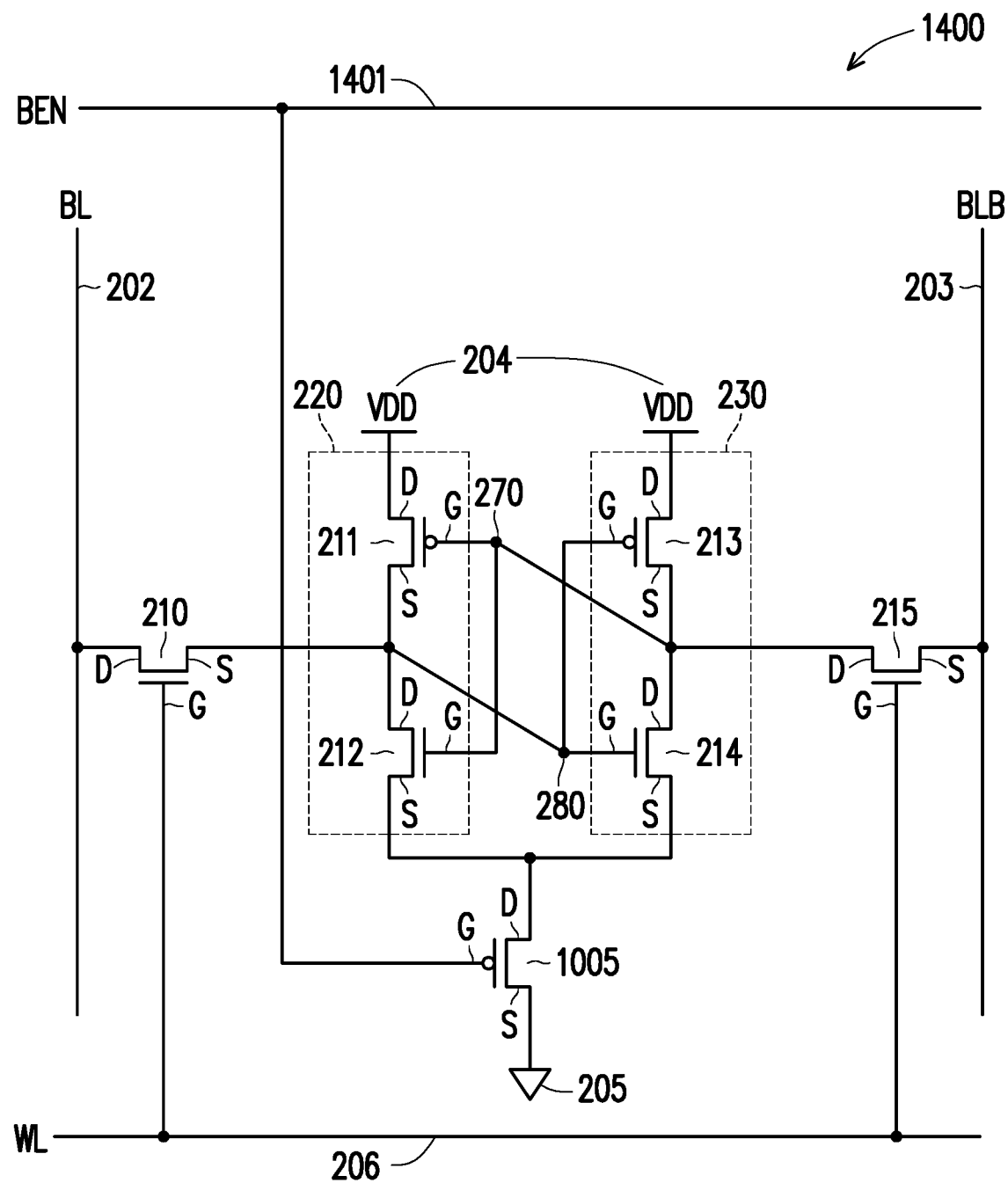
FIG. 14A illustrates an exemplary circuit diagram of a bit cell that is implemented as a SRAM bit cell with an in-bitcell enable (EN) transistor, in accordance with various embodiments of the present disclosure.

FIG. 14A illustrates an exemplary circuit diagram of a bit cell 1400 that is implemented as a bit cell with an in-bitcell enable (EN) transistor, in accordance with some embodiments of the present disclosure. The bit cell 1400 includes transistors: M1 210, M2 211, M3 212, M4 213, M5 214, M6 215, M7 1005. In some embodiments, the transistor M7 1005 is an EN transistor.

In some embodiments, the transistors M2 211 and M3 212 are formed as a first inverter 220 on the left and the transistors M4 213 and M5 214 are formed as a second inverter 230 on the right wherein the first and second inverters 220/230 are cross-coupled to each other. More specifically, source terminal of the transistor M2 211 is coupled with drain terminal of the transistor M3 212 at a storage node (SN) 250. Similarly, source terminal of the transistor M4 213 is coupled with drain terminal of the transistor M5 214 at a storage node bar (SNB) 260. Gate terminals of the transistors M2 211 and M3 212 are coupled together at node 270, while gate terminals of the transistors M4 213 and M5 214 are coupled together at node 280. The first and second inverters 220/230 are each coupled between first voltage reference 204 through drain terminals of the transistor M2 211 and M4 213, and second voltage reference 205 through the source terminals of the transistor M3 212 and M4 214. Generally, the first voltage reference is the supply voltage to the bit cell 200. In some embodiments, the first voltage reference 204 is typically referred to as a "VDD". The second voltage reference 205 is typically referred to as the GND 205, e.g., "ground".

In some embodiments, the VSS 205 is coupled to the cross-coupled inverters 220 and 230 through the EN transistors M7 1005, respectively, which are further controlled by the voltage control circuit 120 of the authentication circuit 104 (FIG. 1). Specifically, drain terminal of the EN transistor M7 1005 is coupled to the source terminals of the transistors M3 212 and M5 214. Drain terminal of the EN transistor M7 1005 coupled to the VSS 205, e.g., GND. Gate terminal of the EN transistors M7 1005 is coupled to a bit enable line (BEN) 1401. For example, the VDD 204 is applied to each of the bit cells 1400 of the PUF cell array 200 when the PUF cell array 200 is accessed.

Further, the node 270 of the first inverter 220 is coupled to the SNB 260 and the node 280 of the second inverter 230 is coupled to the SN 250. The first inverter 220 is coupled to source terminal of the transistor M1 210 at SN 250, and the second inverter 230 is coupled to drain terminal of the transistor M6 215. In addition to being coupled to the cross-coupled inverters 220/230, gate terminals of the transistors M1 210 and M6 215 are both coupled to the WL 206. Drain terminal of the transistor M1 210 and source terminal of the transistor M6 215 each coupled to the BL 202 and BLB 203, respectively. The transistors M1 210 and M6 215 are typically referred to as access transistors of the bit cell 200. Source terminals of the transistors M9 1304 and M10 1305 are coupled to the node SN 250 and SNB 260, respectively. In some embodiments, the transistors M1 210, M3 212, M5 214, and M6 215, each includes an NMOS transistor, and the transistors M2 211, M4 213, and M7 1005 each includes a PMOS transistor. In some other embodiments, the transistors M1 210, M3 212, M5 214, and M6 215, each includes a PMOS transistor, and the transistors M2 211, M4 213, and M7 1005 each includes an NMOS transistor, when the VDD 204 and the GND 205 are switched. Although the illustrated embodiments of FIG. 14A shows that M1-M10 are either NMOS or PMOS transistors, any of a variety of transistors or devices that are suitable for use in a memory device may be implemented as at least one of M1-M10 such as, for example, a bipolar junction transistor (BJT), a high-electron mobility transistor (HEMT), etc.

Figure 14B:
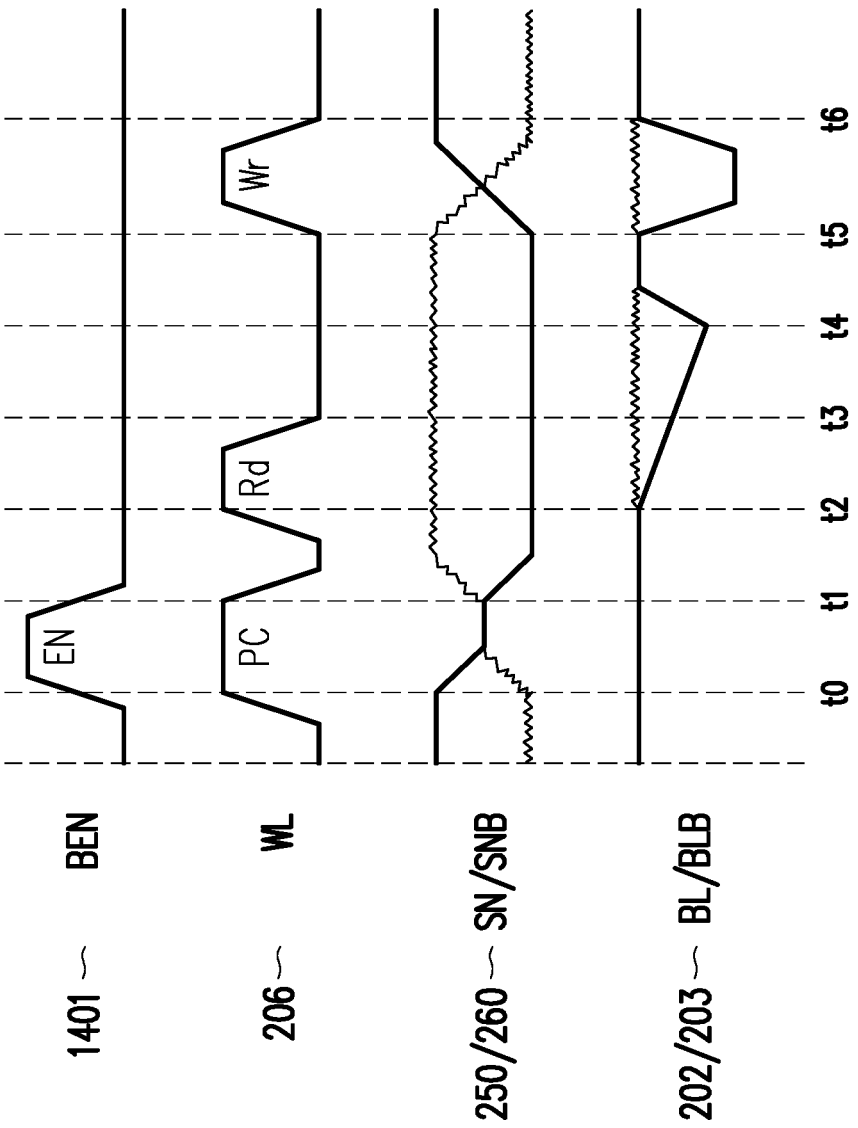
FIG. 14B illustrates waveforms of signals in bit cells of a PUF cell array to generate PUF signatures, in accordance with various embodiments of the present disclosure.

FIG. 14B illustrates waveforms of signals in bit cells 1400 of a PUF cell array to generate PUF signatures, in accordance with various embodiments of the present disclosure. During operation, when the BEN 1401 is pulled up at time to, the cross-coupled inverters 220/230 of the bit cell 1400 are turned off. When the WL 206 is pulled up at time t0, the transistors M1 210 and M6 215 are turned on. This allows a preconditioning of the SN/SNB 250/260 to predetermined values. In the illustrated embodiments, the BL/BLB 202/203 are pulled up to VDD, which results in voltage values of VDD-Vtn on the SN/SNB 250/260, wherein Vtn is the threshold values of the access transistors M1 210 and M6 215.

At time t1, the BEN 1401 is pulled down which turns on the cross-coupled inverters 220/230 of the bit cell 1400. The WL 206 is also pulled down which turns off the access transistors 210/215. The metastable state cannot be sustained once the cross-coupled inverters 220/230 are powered on due to the strength difference between the two cross-coupled inverters 220 and 230 caused by intrinsic process variations during fabrication. The small mismatch of strength in the cross-coupled inverters 220/230 will be eventually amplified by the positive feedback of the cross-coupled inverters 220/230 and will eventually generate either logic "1" or logic "0". The randomness is caused by the fabrication process of the transistors in the cross-coupled inverters 220/230, the binary output of the logical states, when the plurality of bit cells 1400 are stabilized after being powered up, are unique, random and non-traceable.

The WL 206 is pulled up at time t2 to enable a readout of the SN 250 and SNB 260 to the BL 202 and BLB 203, respectively. The WL 206 is then pulled down at time t3 while the BEN 1401 is kept low, the PUF is stored at the storage nodes 250/260 until the BEN 1401 is pulled up at time t5 which turns on the two access transistors 210/215 and the BL 202 and BLB 203 are pulled up and down, respectively, which write logical states to the SN/SNB 250/260.

Figure 15:
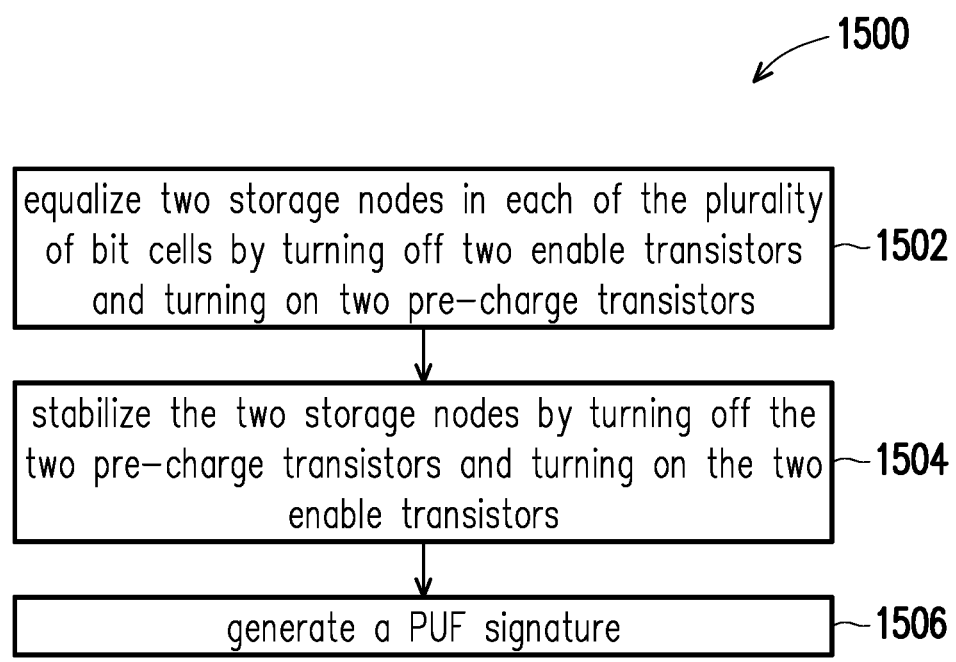
FIG. 15 illustrates a flow chart of a method to generate PUF signatures based on a PUF cell array comprising a plurality of bit cells, in accordance with various embodiments of present disclosure.

FIG. 15 illustrates a flow chart of a method 1500 to generate a PUF signature based on a PUF cell array 102 comprising a plurality of bit cells 1300, in accordance with various embodiments of present disclosure. In some embodiments, the operations of method 1500 are performed by the respective components illustrated in FIGS. 1, 2A, and 13. For purposes of discussion, the following embodiment of the method 1500 will be described in conjunction with FIGS. 1, 2A, and 13. The illustrated embodiment of the method 1500 is merely an example. Therefore, it should be understood that any of a variety of operations may be omitted, re-sequenced, and/or added while remaining within the scope of the present disclosure.

The method 1500 continues with operation 1502 in which two storage nodes SN 250 and SNB 260 in the plurality of bit cells 1300 are equalized (i.e., pre-discharged) to logic states of "0", in accordance with various embodiments. Continuing with the example, the PUF control circuit 114 further pre-charge the SN 250 and SNB 260 to "0" by pulling up the corresponding BPC 1301 of the plurality of bit cells 200 so as to turn on the PC transistors M9 1304 and M10 1305 and turn off the EN transistors M7 1302 and M8 1303 in the plurality of bit cells 1300. In some embodiments, SN 250 and SNB 260 are pre-charged to logical states of "1", when VDD 204 and GND 205 are switched, wherein source terminals of the PC transistors M9 1304 and M10 1305 are coupled to VDD 204.

The method 1500 continues to operation 1504 in which the two storage nodes SN 250/SNB 260 in each of the plurality of bit cells 1300 are stabilized by turning off the two pre-charge transistors 1304/1305 and turning on the two enable transistors 1302/1303, in accordance with various embodiments of present disclosure. Continuing with above example, the BPC 1301 of the plurality of bit cells 1300 is pulled down, in accordance with various embodiments. Referring to FIGS. 2A and 13, the PUF control circuit 114 turns on all the bit cells 1300 by pulling down the corresponding BPC 1301 so as to turn on the EN transistors M7 1302 and M8 1303 and turn off the PC transistors M9 1304 and M10 1305 the plurality of bit cells 1300. The PUF control circuit 114 reads the logical state of each bit cells 1300 of the selected one or more rows by pulling up the WL 206 which enables the access transistors M1 210 and M6 215. Referring to FIGS. 2A and 13, each cross-coupled inverters 220/230 are intrinsically different (e.g., strength of transistors) due to the variations in manufacturing processes and small differences in the cross-coupled inverters are amplified by the positive feedback of the cross-coupled inverters and eventually depending on the difference between the cross-coupled inverters, a logical state "1" or "0" is generated and stabilized on the two storage nodes SN 205 and SNB 260 for the bit cell. This small difference, in some embodiments, caused by the strength of the cross-coupled inverters 220/230, represents the unique asymmetry in the bit cell 1300. In some embodiments, an initial difference in the values stored in SN 250 and SNB 260 caused by the difference in the PC transistors at the respective storage nodes (e.g., M9 1304 at SN 250 and M10 1305 at SNB 260) may also contribute to the unique asymmetry in the bit cell 1300.

The method 1500 continues with operation 1506 in which a PUF signature is generated, in accordance with various embodiments. The PUF control circuit 114 uses the stabilized logical states of the bit cells 1300 in one or more rows of the PUF cell array 102 to generate a PUF signature. As mentioned above, a PUF signature, generated based on one or more intrinsic randomness of the plurality of bit cells 1300 in a PUF cell array 102, is unique to the PUF cell array 102.

In some embodiments, before operation 1506, operations 1502 and 1504 can be repeated multiple times to obtain a histogram (i.e., a frequency plot) of logical states of each bit cells 1300 in one or more rows of the PUF cell array 102. The histogram is used as an accurate representation of the distribution of logical states of each bit cells 1300 within a plurality of challenge-response cycles. In some embodiments, if over and equal to 70% of logical states collected from a bit cell 1300 over a plurality of challenge-response cycles is either "1" or "0", then the bit cell 1300 is considered to be stable and the logical states of such stable bit cells 1300 are selected and used together as a PUF signature. In some embodiments, unstable bit cells will be abandoned or excluded from being used as part of the PUF signature.

In one embodiment, a physical unclonable function (PUF) generator includes: a PUF cell array that comprises a plurality of bit cells, wherein each of the plurality of bit cells comprises at least two pre-charge transistors, at least one enable transistor, and at least two storage nodes, wherein the at least two storage nodes are pre-charged with substantially the same voltages by the respective at least two pre-charge transistors allowing each of the plurality of bit cells having a first metastable logical state; and an authentication circuit, coupled to the PUF cell array, wherein the authentication circuit is configured to access and determine second logical states of bit cells in at least one row of the PUF cell array by turning on the at least one enable transistor and turning off the at least two pre-charge transistors of each of the bit cell in the at least one row of the PUF cell array, and based on the determined second logical states of the bit cells in the at least one row of the PUF cell array, to generate a PUF signature.

In another embodiment, a physical unclonable function (PUF) generator includes: a PUF cell array that comprises a plurality of bit cells, wherein each of the plurality of bit cells is pre-configured with a first logical state; and an authentication circuit, coupled to the PUF cell array, wherein the authentication circuit is configured to recursively access bit cells in at least one row of the PUF cell array at a plurality of access times under at least one stressed condition so as to detect when the corresponding first logical states flip to second logical states, and based on the determined second logical states of the bit cells in the at least one row of the PUF cell array, to generate a PUF signature.

Yet, in another embodiment, a physical unclonable function (PUF) generator includes: a PUF cell array that comprises a plurality of bit cells, wherein each of the plurality of bit cells comprises at least one equalizer transistor, at least one enable transistor, and at least two storage nodes, wherein the at least two storage nodes are pre-configured with substantially the same voltages by at least one equalizer allowing each of the plurality of bit cells being configured with a first metastable logical state; and an authentication circuit, coupled to the PUF cell array, wherein the authentication circuit is configured to access and determine second logical states of bit cells in at least one row of the PUF cell array by turning on the at least one enable transistor and turning off the at least one equalizer of each of the bit cell in the at least one row of the PUF cell array, and based on the determined second logical states of the bit cells in the at least one row of the PUF cell array, to generate a PUF signature.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physical unclonable function (PUF) generator comprising:
   a PUF cell array that comprises a plurality of bit cells, wherein each of the plurality of bit cells comprises at least two pre-charge transistors, at least one enable transistor, and at least two storage nodes, wherein the at least two storage nodes are pre-charged with the same voltages by the respective at least two pre-charge transistors allowing each of the plurality of bit cells having a first metastable logical state; and
   an authentication circuit, coupled to the PUF cell array, wherein the authentication circuit is configured to access and determine second logical states of bit cells in at least one row of the PUF cell array by turning on the at least one enable transistor and turning off the at least two pre-charge transistors of each of the bit cell in the at least one row of the PUF cell array, and based on the determined second logical states of the bit cells in the at least one row of the PUF cell array, to generate a PUF signature.

2. The PUF generator of claim 1, wherein the plurality of bit cells each further comprises two cross-coupled inverters and two access transistors.

3. The PUF generator of claim 1, wherein the at least two pre-charge transistors each is coupled between a first voltage and a respective storage node.

4. The PUF generator of claim 1, wherein the at least two pre-charge transistors each comprises a NMOS transistor.

5. The PUF generator of claim 1, wherein the authentication circuit comprises a PUF control circuit, coupled to the plurality of bit cells and configured to provide a first voltage, a VDD, and a word line (WL) voltage to the PUF cell.

6. The PUF generator of claim 5, wherein the PUF control circuit is configured to
   turn off the at least one enable transistor and turn on the at least two pre-charge transistors to write the first metastable logical state to each of the plurality of bit cells of the PUF cell array;
   turn on the at least one enable transistor and turn off the at least two pre-charge transistors to allow the first metastable logical state to stabilize to the second logical state in each of the plurality of bit cells of the PUF cell array; and
   turn on the two access transistors of the bit cells in the at least one row of the PUF cell array when the second logical states of the bit cells in the at least one row of the PUF cell array are readout.

7. The PUF generator of claim 1, wherein the authentication circuit is further configured to use the second logical states of the bit cells in the at least one row of the PUF cell array to generate the PUF signature.

8. A method for generating a physical unclonable function (PUF) signature comprising:
   equalizing at least two storage nodes with the same voltages in each of a plurality of bit cells in a plurality of column and at least one row of a PUF cell array by turning on at least two pre-discharge transistors coupled to each of the plurality of bit cells allowing each of the plurality of bit cells having a first metastable logical state, wherein each of the plurality of bit cells comprises at least one enable transistor, at least two access transistors, and at least two storage nodes;
   stabilizing the first metastable logical state in each of the plurality of bit cells to a second logical state by turning on the at least one enable transistor and turning off the at least two access transistors allowing each of the plurality of bit cells to determine a second logical state; and
   generating a PUF signature by turning on the at least two access transistors to read out the second logical states of the plurality of bit cells.

9. The method of claim 8, wherein the plurality of bit cells each further comprises two cross-coupled inverters.

10. The method of claim 8, wherein the at least two pre-charge transistors each is coupled between a first voltage and a respective storage node.

11. The method of claim 8, wherein the at least two pre-charge transistors each comprises a NMOS transistor.

12. The method of claim 8, wherein the authentication circuit comprises a PUF control circuit, coupled to the plurality of bit cells and configured to provide a first voltage, a power supply voltage, and a word line (WL) voltage to the plurality of bit cells.

13. The PUF generator of claim 12, wherein the PUF control circuit is configured to
   turn off the at least one enable transistor and turn on the at least two pre-charge transistors to write the first metastable logical state to each of the plurality of bit cells;
   turn on the at least one enable transistor and turn off the at least two pre-charge transistors to allow the first metastable logical state to stabilize to the second logical state in each of the plurality of bit cells; and
   turn on the two access transistors when the second logical states of the bit cells in the at least one row of the PUF cell array are readout.

14. The PUF generator of claim 8, wherein the authentication circuit is further configured to use the second logical states of the bit cells in the at least one row of the PUF cell array to generate the PUF signature.

15. A physical unclonable function (PUF) generator comprising:
   a PUF cell array that comprises a plurality of bit cells, wherein each of the plurality of bit cells comprises at least two pre-charge transistors, at least one enable transistor, and at least two storage nodes, wherein the at least two storage nodes are pre-charged with the same voltages by the respective at least two pre-charge transistors allowing each of the plurality of bit cells to have a first logical state; and an authentication circuit, coupled to the PUF cell array, wherein the authentication circuit is configured to recursively access bit cells in at least one row of the PUF cell array at a plurality of access times under at least one stressed condition so as to detect when the corresponding first logical states flip to second logical states, and based on the determined second logical states of the bit cells in the at least one row of the PUF cell array, to generate a PUF signature.

16. The PUF generator of claim 15, wherein the at least one stressed condition comprises a stressed read condition and a stressed write condition.

17. The PUF generator of claim 15, wherein the plurality of bit cells each further comprises two cross-coupled inverters and two access transistors.

18. The PUF generator of claim 15, wherein the authentication circuit comprises a PUF control circuit and a timing control circuit, coupled to the plurality of bit cells and configured to provide a first voltage, a VDD, a word line (WL) voltage, a pulse width of the WL voltage, and a pulse width of sense amplifier enable (SAE) to the PUF cell.

19. The PUF generator of claim 15, wherein the authentication circuit is further configured to use logical states of the bit cells in the at least one row of the PUF cell array at a first access time to generate the PUF signature.

20. The PUF generator of claim 15, wherein the authentication circuit is configured to perform at least one of the following to the bit cells in the at least one row of the PUF cell array:

reducing a power supply voltage (VDD) recursively when the first logical state is read out so as to cause the plurality of bit cells to be accessed under the stressed read condition;

reducing a write line (WL) voltage recursively when the first logical state is read out so as to cause the plurality of bit cells to be accessed under the stressed read condition;

increasing a ground voltage (GND) recursively when the first logical state is to be overwritten with a second logical state that is complementary to the first logical state so as to cause the plurality of bit cells to be accessed under the stressed write condition;

reducing the WL voltage recursively when the first logical state is to be overwritten with the second logical state that is complementary to the first logical state so as to cause the plurality of bit cells to be accessed under the stressed write condition;

reducing the WL pulse width of the WL voltage recursively when the first logical state is to be overwritten with the second logical state that is complementary to the first logical state so as to cause the first bit to be accessed under the stressed write condition;

reducing a sense amplifier enable (SAE) width recursively when the first logical state is read out so as to cause the plurality of bit cells to be accessed under the stressed read condition.

* * * * *